(12) United States Patent
Sakurai et al.

(10) Patent No.: US 10,975,203 B2
(45) Date of Patent: Apr. 13, 2021

(54) COATING COMPOSITION

(71) Applicant: SUMITOMO CHEMICAL COMPANY, LIMITED, Tokyo (JP)

(72) Inventors: Sayaka Sakurai, Osaka (JP); Hidenori Hanaoka, Osaka (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 286 days.

(21) Appl. No.: 16/066,238

(22) PCT Filed: Dec. 19, 2016

(86) PCT No.: PCT/JP2016/087747
§ 371 (c)(1),
(2) Date: Jun. 26, 2018

(87) PCT Pub. No.: WO2017/115679
PCT Pub. Date: Jul. 6, 2017

(65) Prior Publication Data
US 2020/0123327 A1 Apr. 23, 2020

(30) Foreign Application Priority Data
Dec. 28, 2015 (JP) .............................. JP2015-257346

(51) Int. Cl.
*C08G 77/18* (2006.01)
*C08G 77/50* (2006.01)
(Continued)

(52) U.S. Cl.
CPC ............. *C08G 77/18* (2013.01); *C08G 77/50* (2013.01); *C08K 5/56* (2013.01); *C09D 183/14* (2013.01);
(Continued)

(58) Field of Classification Search
None
See application file for complete search history.

(56) References Cited

U.S. PATENT DOCUMENTS 5,681,914 A  10/1997 Kobayashi et al.
6,183,872 B1  2/2001 Tanaka et al.
(Continued)

FOREIGN PATENT DOCUMENTS

CN   102220181 A   10/2011
CN   102308250 A   1/2012
(Continued)

OTHER PUBLICATIONS

Machine translation of JP-2015168785, translation generated Sep. 2020, 40 pages. (Year: 2020).*

(Continued)

*Primary Examiner* — Robert S Loewe
(74) *Attorney, Agent, or Firm* — Birch, Stewart, Kolasch & Birch, LLP.

(57) ABSTRACT

It is an object to provide a composition used for formation of a coating film which simultaneously attains water repellency as well as heat resistance and light resistance.

The composition of the present invention includes an organosilicon compound (a) which has at least one trialkylsilyl group and has two or more hydrolyzable silicon groups, and a metal compound (b) in which at least one hydrolyzable group is bonded to a metal atom.

5 Claims, 1 Drawing Sheet

(51) Int. Cl.
 *C08K 5/56* (2006.01)
 *C09D 183/14* (2006.01)
(52) U.S. Cl.
 CPC ....... *C08L 2201/08* (2013.01); *C08L 2203/16* (2013.01); *C08L 2312/08* (2013.01)

(56) References Cited

U.S. PATENT DOCUMENTS

| | | | | |
|---|---|---|---|---|
| 6,306,992 | B1* | 10/2001 | Yoshitake | C07F 7/0838 |
| | | | | 526/279 |
| 9,951,090 | B2* | 4/2018 | Akabane | C07F 7/0889 |
| 10,472,378 | B2* | 11/2019 | Sakurai | C07F 7/1804 |
| 2003/0212197 | A1 | 11/2003 | Sakamoto et al. | |
| 2004/0242762 | A1 | 12/2004 | Horikoshi et al. | |
| 2007/0185259 | A1 | 8/2007 | Hoshino | |
| 2007/0197758 | A1 | 8/2007 | Yamane et al. | |
| 2010/0036034 | A1 | 2/2010 | Araki et al. | |
| 2011/0163460 | A1* | 7/2011 | Kato | C08L 83/04 |
| | | | | 257/791 |
| 2011/0248211 | A1 | 10/2011 | Matsumoto et al. | |
| 2012/0085964 | A1* | 4/2012 | Matsumoto | C09J 183/04 |
| | | | | 252/78.3 |
| 2012/0177402 | A1* | 7/2012 | Taniguchi | C08G 77/50 |
| | | | | 399/111 |
| 2014/0094554 | A1* | 4/2014 | Matsumoto | C08L 83/06 |
| | | | | 524/432 |
| 2017/0313728 | A1 | 11/2017 | Sakurai et al. | |

FOREIGN PATENT DOCUMENTS

| | | | | |
|---|---|---|---|---|
| JP | 8-311403 | A | 11/1996 | |
| JP | 8-319424 | A | 12/1996 | |
| JP | 9-157388 | A | 6/1997 | |
| JP | 2003-327829 | A | 11/2003 | |
| JP | 2004-115572 | A | 4/2004 | |
| JP | 2007-63388 | A | 3/2007 | |
| JP | 2007-297589 | A | 11/2007 | |
| JP | 2010-37507 | A | 2/2010 | |
| JP | 2011-208120 | A | 10/2011 | |
| JP | 2011-219664 | A | 11/2011 | |
| JP | 2013-213181 | A | 10/2013 | |
| JP | 2014-234506 | A | 12/2014 | |
| JP | 2015168785 | A * | 9/2015 | ............... C09K 3/18 |
| TW | 200502322 | A | 1/2005 | |
| WO | WO 2005/030874 | A1 | 4/2005 | |
| WO | WO 2015/022998 | S1 | 2/2015 | |
| WO | WO-2015022998 | A1 * | 2/2015 | ............... C08K 9/06 |
| WO | WO 2016/068138 | A1 | 5/2016 | |

OTHER PUBLICATIONS

International Search Report (PCT/ISA/210) issued in PCT/JP2016/087747, dated Feb. 21, 2017.
Japanese Office Action, dated Feb. 4, 2020, for Japanese Application No. 2016-245962, with an English machine translation.
Chinese Office Action and Search Report for Chinese Application No. 201680075999.3, dated Aug. 3, 2020, with English translation of the Office Action.
Taiwanese Office Action, dated Sep. 8, 2020, for corresponding Taiwanese Application No. 201736518.A, with an English machine translation.

* cited by examiner

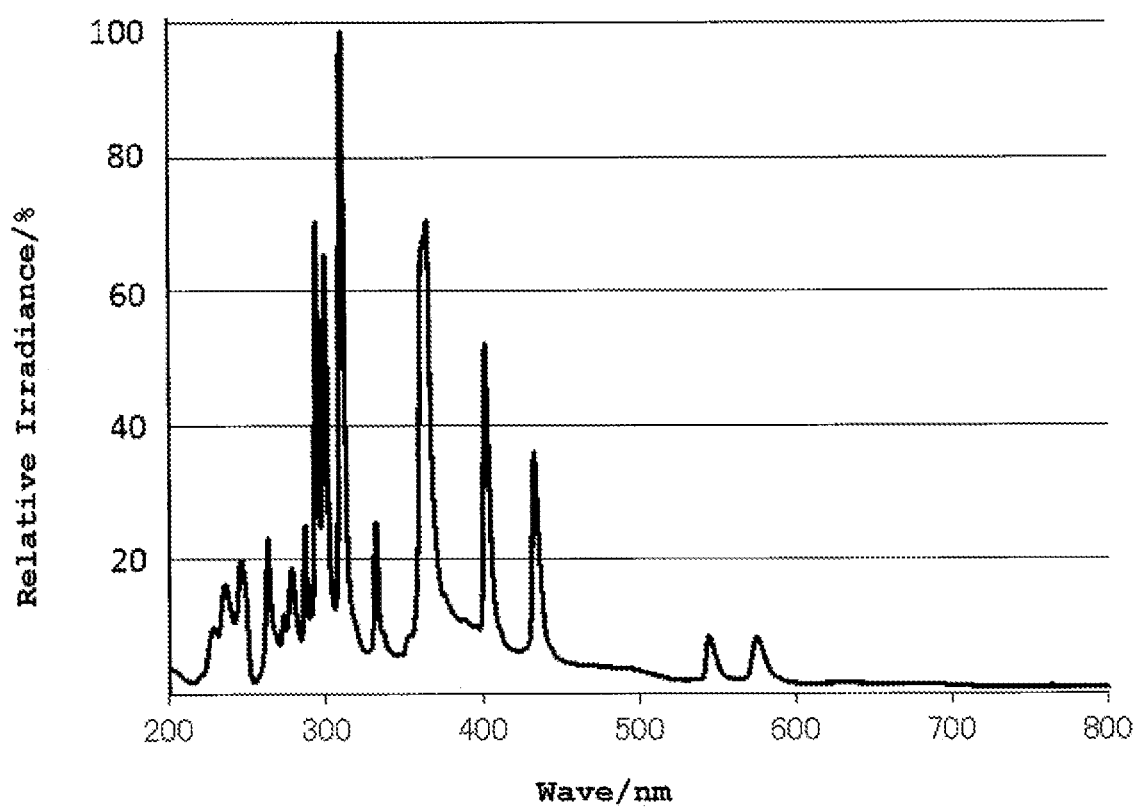

COATING COMPOSITION

TECHNICAL FIELD

The present invention relates to a composition that forms a coating film capable of imparting water repellency to various substrates.

BACKGROUND ART

In various display devices, optical elements, semiconductor elements, building materials, automobile components, and nanoimprint techniques, adhesion of a liquid droplet onto a surface of a substrate may cause a problem of contamination and corrosion of the substrate, or further deterioration in performance due to the contamination and corrosion. Therefore, in these fields, the substrate surface is required to have satisfactory water repellency. Heat resistance and light resistance are also required to withstand outdoor use.

For the purpose of enhancing the water repellency or the like of the substrate surface as mentioned above, Patent Document 1 proposes a transparent film which is formed by applying a precursor solution prepared by cohydrolytic polycondensation of an organosilane and a metal alkoxide onto a substrate surface of the substrate. Patent Document 2 proposes a silicon-containing organic fluorine-containing polymer having a perfluoroalkyl group.

PRIOR ART DOCUMENT

Patent Document

Patent Document 1: JP 2013-213181 A
Patent Document 2: JP 9-157388 A
Patent Document 3: JP 2014-234506 A

DISCLOSURE OF THE INVENTION

Problems to be Solved by the Invention

The present inventors have obtained knowledge that use of the compounds mentioned in aforementioned Patent Documents 1 and 2 may lead to insufficient heat resistance and light resistance. Insufficient heat resistance and light resistance may cause deterioration of the film, resulting in deterioration of the water repellency. When using the composition mentioned in Patent Document 3, satisfactory light resistance is obtained but the heat resistance may be inferior, so that clouding and coating unevenness may occur in the film after film formation, thus substantially requiring the step of wiping-up the outermost surface after film formation. Thus, it is an object of the present invention to provide a composition used for formation of a coating film which simultaneously attains water repellency as well as heat resistance and light resistance (hereinafter heat resistance and light resistance are collectively referred to as "weatherability"), and which is free from clouding and coating unevenness after film formation and requires no wiping-up step.

Means for Solving the Problems

In view of the above circumstances, the present inventors have intensively studied and found that a coating film having not only satisfactory water repellency, but also satisfactory heat resistance and light resistance is obtained by using a composition containing a specific organosilicon compound (a) and a metal compound (b), thus completing the present invention.

Namely, the composition according to the present invention includes an organosilicon compound (a) which has at least one trialkylsilyl group and has two or more hydrolyzable silicon groups, and a metal compound (b) in which at least one hydrolyzable group is bonded to a metal atom.

The organosilicon compound (a) is preferably a compound represented by formula (Ia):

[Chemical Formula 1]

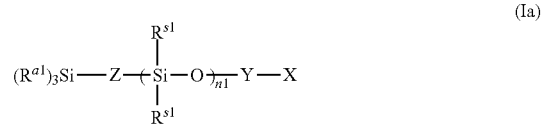

wherein, in formula (Ia), Y represents a single bond or $*-Si(R^{s2})_2-L^{s1}-$, in which $*$ represents a bond with an oxygen atom, Z represents an oxygen atom or a divalent hydrocarbon group having 1 to 10 carbon atoms, $R^{a1}$ each independently represents a hydrocarbon group or a trialkylsilyloxy group, a hydrocarbon group represented by $R^{a1}$ is an alkyl group when all $R^{a1}$(s) are hydrocarbon groups, $R^{s1}$ and $R^{s2}$ each independently represents an alkyl group having 1 to 10 carbon atoms, $L^{s1}$ represents a divalent hydrocarbon group having 1 to 10 carbon atoms, X represents a hydrolyzable silicon-containing group having two or more hydrolyzable silicon groups, and n1 represents an integer of 1 or more and 150 or less.

The hydrolyzable silicon-containing group is preferably a group represented by any one of formulas (X-1) to (X-3):

[Chemical Formula 2]

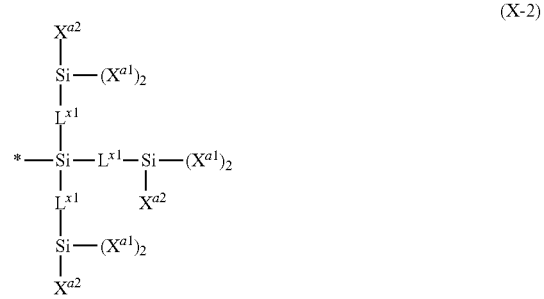

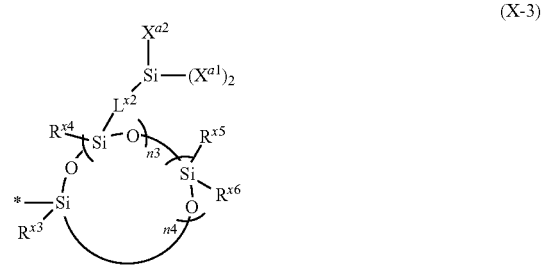

wherein, in formulas (X-1) to (X-3), $L^{x1}$ to $L^{x2}$ each independently represents a divalent hydrocarbon group having 1 to 20 carbon atoms, and a methylene group (—CH$_2$—) included in the divalent hydrocarbon group may be substituted with —O— or —O—Si(R$^{x7}$)$_2$—, $R^{x1}$ to $R^{x7}$ each independently represents a hydrogen atom or a hydrocarbon group having 1 to 10 carbon atoms, $X^{a1}$ each independently represents a hydrolyzable group or a trialkoxysilyloxy group, $X^{a2}$ each independently represents a trialkylsilyl-containing group, a hydrocarbon chain-containing group, a siloxane backbone-containing group, a hydrolyzable group, or a trialkoxysilyloxy group, $X^{a2}$ and $X^{a1}$ may be the same or different when $X^{a2}$ is a hydrolyzable group, n2 represents an integer of 1 or more and 50 or less, n3 represents an integer of 2 or more and 5 or less, n4 represents an integer of 0 or more and 5 or less and, in formula (X-3), the order of units represented by (Si(R$^{x4}$)(-L$^{x2}$-Si(X$^{a2}$)(X$^{a1}$)$_2$)—O—) and (Si(R$^{x5}$)(R$^{x6}$)—O—) is arbitrary.

A ratio of the metal compound (b) to the organosilicon compound (a) (metal compound (b)/organosilicon compound (a)) is preferably 0.1 or more and 100 or less in terms of mol.

It is preferred that the composition further includes a solvent (c).

A coating film which is a cured product of the composition is also included in the technical scope of the present invention.

The organosilicon compound (a) is preferably a compound represented by the following formula:

[Chemical Formula 3]

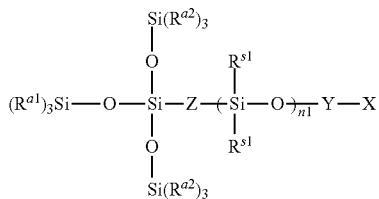

(Ia-1)

wherein, in formula (Ia-1), Y represents a single bond or *—Si(R$^{s2}$)$_2$-L$^{s1}$-, and * represents a bond with an oxygen atom, Z represents an oxygen atom or a divalent hydrocarbon group having 1 to 10 carbon atoms, $R^{a2}$ each independently represents an alkyl group having 1 to 4 carbon atoms, $R^{s1}$ and $R^{s2}$ each independently represents a hydrocarbon group having 1 to 10 carbon atoms, $L^{s1}$ represents a divalent hydrocarbon group having 1 to 10 carbon atoms, n1 represents an integer of 1 or more and 150 or less, and X represents a group represented by any one of formulas (X-1) to (X-3):

[Chemical Formula 4]

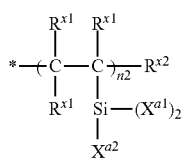

(X-1)

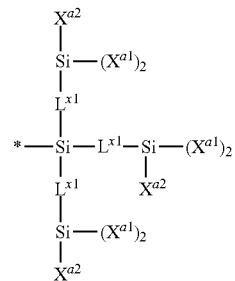

(X-2)

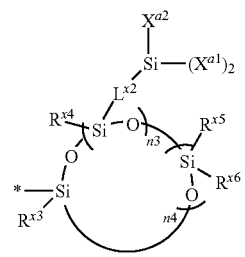

(X-3)

wherein, in formulas (X-1) to (X-3), $L^{x1}$ to $L^{x2}$ each independently represents a divalent hydrocarbon group having 1 to 20 carbon atoms, and a methylene group (—CH$_2$—) included in the divalent hydrocarbon group may be substituted with —O— or —O—Si(R$^{x7}$)$_2$—, $R^{x1}$ to $R^{x7}$ each independently represents a hydrogen atom or a hydrocarbon group having 1 to 10 carbon atoms, $X^{a1}$ each independently represents a hydrolyzable group or a trialkoxysilyloxy group, $X^{a2}$ each independently represents a trialkylsilyl-containing group, a hydrocarbon chain-containing group, a siloxane backbone-containing group, a hydrolyzable group, or a trialkoxysilyloxy group, $X^{a2}$ and $X^{a1}$ may be the same or different when $X^{a2}$ is a hydrolyzable group, n2 represents an integer of 2 or more and 20 or less, n3 represents an integer of 2 or more and 5 or less, n4 represents an integer of 0 or more and 5 or less and, in formula (X-3), the order of units represented by (Si(R$^{x4}$)(-L$^{x2}$-Si(X$^{a2}$)(X$^{a1}$)$_2$)—O—) and (Si(R$^{x5}$)(R$^{x6}$)—O—) is arbitrary.

A compound represented by the following formula is a compound which is preferable as a raw material of the organosilicon compound (a):

[Chemical Formula 5]

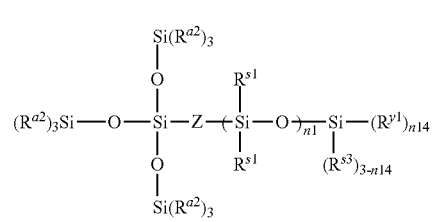

(IIa-1)

wherein, in formula (IIa-1),

Z represents an oxygen atom or a divalent hydrocarbon group having 1 to 10 carbon atoms, $R^{s1}$ each independently represents a hydrocarbon group having 1 to 4 carbon atoms, $R^{a2}$ and $R^{s3}$ each independently represents an alkyl group having 1 to 4 carbon atoms, $R^{y1}$ represents an alkenyl group having 2 to 10 carbon atoms, n1 represents an integer of 1 or more and 150 or less, and n14 represents an integer of 1 or more and 3 or less.

Effects of the Invention

The composition of the present invention includes a specific organosilicon compound (a) and a metal compound (b), and thus it is possible to provide a coating film having not only satisfactory water repellency but also satisfactory heat resistance and light resistance. It is also possible to provide a coating film which is free from clouding and coating unevenness after film formation and requires no wiping-up step.

BRIEF DESCRIPTION OF THE DRAWINGS

FIG. 1 shows a spectral irradiance of "SP-9 250DB" manufactured by USHIO INC.

MODE FOR CARRYING OUT THE INVENTION

The composition of the present invention includes an organosilicon compound (a) which has at least one trialkylsilyl group and has two or more hydrolyzable silicon groups, and a metal compound (b) in which at least one hydrolyzable group is bonded to a metal atom. The trialkylsilyl group derived from the organosilicon compound (a) reduces friction between a coating film obtained from the composition of the present invention and a liquid droplet (water and oil droplets, etc.), thus making it easy to move the liquid droplet and enhancing chemical/physical durability, leading to an improvement in heat resistance and light resistance. Meanwhile, the structure derived from the metal compound (b) substantially functions as a spacer, thus enabling further enhancement in water repellency of the coating film. As mentioned above, the composition of the present invention can provide a coating film which has not only enhanced water-repellent function but also light resistance and heat resistance (hereinafter, light resistance and heat resistance are sometimes collectively referred to as "weatherability"). It is also possible to provide a coating film which is free from clouding and coating unevenness after film formation and requires no wiping-up step. The organosilicon compound (a) of the present invention have two or more hydrolyzable silicon groups, and thus the organosilicon compound can be firmly bonded to the substrate. The organosilicon compound (a) preferably has three or more hydrolyzable silicon groups. The number of hydrolyzable silicon groups is preferably 20 or less, and more preferably 15 or less.

Here, the hydrolyzable silicon group means a group in which a group capable of forming a silanol group (Si(OH) group) by hydrolysis (hereinafter sometimes referred to as "hydrolyzable group") is bonded to a silicon atom and is preferably a group in which at least one (preferably two or more, and more preferably three) hydrolyzable group is bonded to one silicon atom.

In the organosilicon compound (a), the trialkylsilyl group and the hydrolyzable silicon group are preferably bonded to the hydrolyzable silicon group through a chain or cyclic (also including a combination of chain and cyclic, the same shall apply hereinafter) hydrocarbon and/or a chain or cyclic dialkylsiloxane. Whereby, water repellency due to the trialkylsilyl group is more effectively exhibited. Here, the dialkylsiloxane means a molecular chain in which silicon atoms to which two alkyl groups are bonded and oxygen atoms are alternately combined.

The organosilicon compound (a) is preferably a compound represented by formula (Ia):

[Chemical Formula 6]

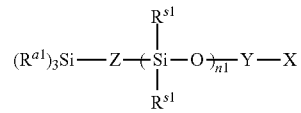

(Ia)

wherein, in formula (Ia), Y represents a single bond or *—Si($R^{s2}$)$_2$-$L^{s1}$-, in which * represents a bond with an oxygen atom, Z represents an oxygen atom or a divalent hydrocarbon group having 1 to 10 carbon atoms, $R^{a1}$ each independently represents a hydrocarbon group or a trialkylsilyloxy group, a hydrocarbon group represented by $R^{a1}$ is an alkyl group when all $R^{a1}$(s) are hydrocarbon groups, $R^{s1}$ and $R^{s2}$ each independently represents an alkyl group having 1 to 10 carbon atoms, $L^{s1}$ represents a divalent hydrocarbon group having 1 to 10 carbon atoms, X represents a hydrolyzable silicon-containing group having two or more hydrolyzable silicon groups, and n1 represents an integer of 1 or more and 150 or less.

In the formula (Ia), the number of carbon atoms of the hydrocarbon group for $R^{a1}$ is preferably 1 to 4, more preferably 1 to 3, and still more preferably 1 to 2 or less. The hydrocarbon group for $R^{a1}$ may be either linear or branched and is preferably linear. The hydrocarbon group for $R^{a1}$ is preferably an aliphatic hydrocarbon group, and more preferably an alkyl group. Examples of the hydrocarbon group for $R^{a1}$ include linear alkyl groups such as a methyl group, an ethyl group, a propyl group, and a butyl group.

The number of carbon atoms of the alkyl group included in the trialkylsilyloxy group for $R^{a1}$ is preferably 1 to 4, more preferably 1 to 3, and still more preferably 1 to 2. In the ($R^{a1}$)$_3$Si— group or trialkylsilyloxy group when all $R^{a1}$(s) are alkyl groups, the total number of carbon atoms of three alkyl group is preferably 9 or less, more preferably 6 or less, and still more preferably 4 or less.

Examples of the alkyl group included in the trialkylsilyloxy group include a methyl group, an ethyl group, a propyl group, a butyl group and the like. In the ($R^{a1}$)$_3$Si— group or trialkylsilyloxy group when all $R^{a1}$(s) are alkyl groups, three alkyl groups may be the same or different from each other and are preferably the same. The ($R^{a1}$)$_3$Si— group or trialkylsilyloxy group, when all $R^{a1}$(s) are alkyl groups, preferably include one or more, more preferably two or more methyl groups, and particularly preferably three alkyl groups.

In the ($R^{a1}$)$_3$Si— group or trialkylsilyloxy group when all $R^{a1}$(s) are alkyl groups, examples of the trialkylsilyl group included include a trialkylsilyl group in which one methyl group is bonded to a silicon atom, such as a methyldiethylsilyl group, a methylethylpropylsilyl group, a methylethylbutylsilyl group, a methyldipropylsilyl group, a methylpropylbutylsilyl group, or a methyldibutylsilyl group; a trialkylsilyl group in which two methyl groups are bonded to a silicon atom, such as a dimethylethylsilyl group, a dimethylpropylsilyl group, or a dimethylbutylsilyl group; and a trimethylsilyl group.

In the ($R^{a1}$)$_3$Si— group or trialkylsilyloxy group when all $R^{a1}$(s) are alkyl groups, the alkyl group included in the trialkylsilyl group may be entirely substituted with a fluoroalkyl group. Examples of the fluoroalkyl group include a group in which at least a part of hydrogen atoms of the alkyl group are substituted with fluorine atoms. The number of carbon atoms of the fluoroalkyl group is preferably 1 to 4, more preferably 1 to 3, and still more preferably 1 to 2. The substitution number of the fluorine atom is preferably 1 or more, and preferably $2 \times n_c+1$ or less when the number of carbon atoms is $n_c$. Examples of the fluoroalkyl group include a monofluoromethyl group, a difluoromethyl group, a trifluoromethyl group (perfluoromethyl group), a monofluoroethyl group, a difluoroethyl group, a trifluoroethyl group, a tetrafluoroethyl group, a pentafluoroethyl group (perfluoroethyl group), a monofluoropropyl group, a difluoropropyl group, a trifluoropropyl group, a tetrafluoropropyl group, a pentafluoropropyl group, a hexafluoropropyl group, a heptafluoropropyl group (perfluoropropyl group), a monofluorobutyl group, a difluorobutyl group, a trifluorobutyl group, a tetrafluorobutyl group, a pentafluorobutyl group, a hexafluorobutyl group, a heptafluorobutyl group, an octafluorobutyl group, a nonafluorobutyl group (perfluorobutyl group) and the like.

When the alkyl group is substituted with a fluoroalkyl group, the substitution number can be appropriately selected in a range of 1 to 3 per one silicon atom.

$R^{a1}$ is preferably an alkyl group or a trialkylsilyloxy group, and more preferably a trialkylsilyl group. Among plural $R^{a1}$(s), two or more $R^{a1}$(s) are preferably trialkylsilyloxy group, and three or more $R^{a1}$(s) are more preferably trialkylsilyloxy groups.

Hereinafter, $(R^{a1})_3Si-Z-(Si(R^{s2})_2-O-)_{n1}-Y-$ is sometimes referred to as a trialkylsilyl group-containing molecular chain.

The above-mentioned Y may be *—$Si(R^{s2})_2$-$L^{s1}$- (in which $L^{s1}$ represents a divalent hydrocarbon group having 1 to 10 carbon atoms), and Z may be a hydrocarbon group having 1 to 10 carbon atoms. Even if a hydrocarbon group is included, the balance is a dialkylsiloxane chain, so that the coating film thus obtained exhibits high chemical/physical durability and is excellent in heat resistance and light resistance. When $L^{s1}$ or Z is a divalent hydrocarbon group, the number of carbon atoms thereof is preferably 8 or less, more preferably 6 or less, and still more preferably 4 or less, and the number of carbon atoms thereof is preferably 1 or more. The divalent hydrocarbon group preferably has a chain form and, in the case of a chain form, the divalent hydrocarbon group may be either linear or branched. The divalent hydrocarbon group is preferably a divalent aliphatic hydrocarbon group, and more preferably an alkylene group. Examples of the divalent hydrocarbon group include alkylene groups such as a methylene group, an ethylene group, a propylene group, a butylene group and the like.

Furthermore, a part of methylene groups (—$CH_2$—) of the divalent hydrocarbon group in $L^{s1}$ or Z may be substituted with oxygen atoms, if necessary. However, continuous two methylene groups (—$CH_2$—) are not simultaneously substituted with oxygen atoms, and it is preferred that the methylene group (—$CH_2$—) adjacent to a Si atom is not substituted with an oxygen atom.

Z is preferably an oxygen atom. When X is a group represented by the below-mentioned formula (X-2), Y is preferably an oxygen atom. When X is a group represented by the below-mentioned formula (X-3), Y is preferably a group represented by *—$Si(R^{s2})_2$-$L^{s1}$-.

The number of carbon atoms of the alkyl group for $R^{s1}$ and $R^{s2}$ is preferably 1 to 4, more preferably 1 to 3, and still more preferably 1 to 2. Examples of the alkyl group for $R^{s1}$ and $R^{s2}$ include a methyl group, an ethyl group, a propyl group, a butyl group and the like. Examples of a dialkylsiloxane chain represented by —$(Si(R^{s1})_2-O-)_{n1}$-include a (poly)dimethylsiloxane chain, a (poly)diethylsiloxane chain and the like.

n1 is 1 or more, preferably 150 or less, more preferably 100 or less, still more preferably 60 or less, and particularly preferably 50 or less, and n is preferably 3 or more.

The number of elements constituting the longest straight chain included in —Z—$(Si(R^{s1})_2-O-)_{n1}$—Y— is preferably 2 or more, more preferably 6 or more, and still more preferably 15 or more, and the number of elements is preferably 1,200 or less, more preferably 700 or less, and still more preferably 500 or less.

The hydrolyzable silicon-containing group for X may be a group having two or more hydrolyzable silicon groups and is preferably, for example, a group in which a hydrolyzable silicon group is bonded to a chain or cyclic base. The base is preferably hydrocarbon and/or (poly)dialkylsiloxane.

X is preferably a group represented by any one of formulas (X-1) to (X-3):

[Chemical Formula 7]

(X-1)

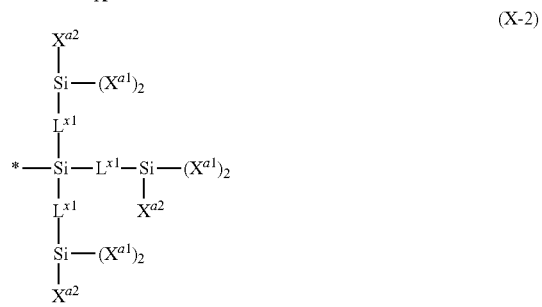

(X-2)

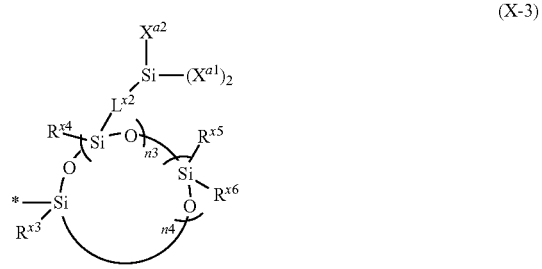

(X-3)

wherein, in formulas (X-1) to (X-3), $L^{x1}$ to $L^{x2}$ each independently represents a divalent hydrocarbon group having 1 to 20 carbon atoms, and a methylene group (—$CH_2$—) included in the divalent hydrocarbon group may be substituted with —O— or —O—$Si(R^{x7})_2$—, $R^{x1}$ to $R^{x7}$ each independently represents a hydrogen atom or a hydrocarbon group having 1 to 10 carbon atoms, $X^{a1}$ each independently represents a hydrolyzable group or a trialkoxysilyloxy group, $X^{a2}$ each independently represents a hydrolyzable group, a trialkoxysilyloxy group, a hydrocarbon chain-containing group, a siloxane backbone-containing group, or a trialkylsilyl group-containing molecular chain, $X^{a2}$ and $X^{a1}$ may be the same or different when $X^{a2}$ is a hydrolyzable group or a trialkoxysilyloxy group, n2 represents an integer of 2 or more and 20 or less,
n3 represents an integer of 2 or more and 5 or less,
n4 represents an integer of 0 or more and 5 or less, and
in formula (X-3), the order of units represented by (Si$(R^{x4})(-L^{x2}-Si(X^{a2})(X^{a1})_2)$—O—) and (Si$(R^{x5})(R^{x6})$—O—) is arbitrary.

The number of carbon atoms of the divalent hydrocarbon group for $L^{x1}$ to $L^{x2}$ is preferably 10 or less, more preferably 6 or less, and still more preferably 4 or less, and the number of carbon atoms of the divalent hydrocarbon group is preferably 1 or more. The divalent hydrocarbon group for $L^{x1}$ to $L^{x2}$ preferably has a chain form and may be either linear or branched. The divalent hydrocarbon group for $L^{x1}$ to $L^{x2}$ is preferably a divalent aliphatic hydrocarbon group, and more preferably an alkylene group. Examples of the divalent hydrocarbon group for $L^{x1}$ to $L^{x2}$ include alkylene groups such as a methylene group, an ethylene group, a propylene group, and a butylene group.

When the methylene group (—$CH_2$—) included in the divalent hydrocarbon group for $L^{x1}$ to $L^{x2}$ is substituted with —O— or —Si$(R^{x7})_2$—O—, among methylene groups (—$CH_2$—) included in $L^{x1}$ to $L^{x2}$, a methylene group (—$CH_2$—) closest to a trimethylsilyl group is preferably substituted and a methylene group (—$CH_2$—) bonded directly to —Si$(X^{a1})^2$ $(X^{a2})$ may or may not be substituted with —O— or —Si$(R^{x7})_2$—O—, and it is preferred that the methylene group is not substituted therewith.

Examples of $L^{x1}$ to $L^{x2}$ include the following groups. In the following, * represents a bond and * on the left side is on the side close to a trimethylsilyl group.

[Chemical Formula 8]

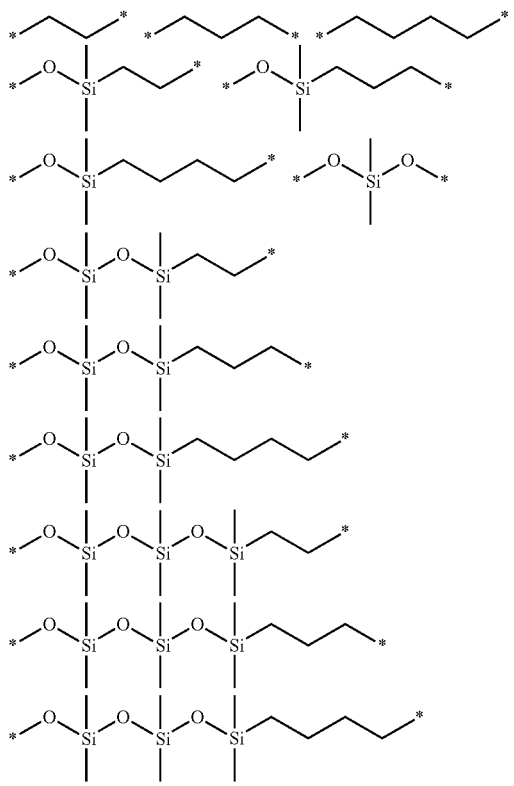

The number of carbon atoms of the hydrocarbon group for $R^{x1}$ to $R^{x7}$ is preferably 1 to 8, more preferably 1 to 6, and still more preferably 1 to 4. The hydrocarbon group for $R^{x1}$ to $R^{x7}$ may have either a chain or cyclic form or may be either linear or branched. The hydrocarbon group for $R^{x1}$ to $R^{x7}$ is preferably an aliphatic hydrocarbon group, and more preferably an alkyl group. Examples of the hydrocarbon group for $R^{x1}$ to $R^{x7}$ include alkyl groups such as a methyl group, an ethyl group, a propyl group, a butyl group, a pentyl group, a hexyl group, a heptyl group, and an octyl group.

Examples of the hydrolyzable group for $X^{a1}$ and $X^{a2}$ include alkoxy groups having 1 to 4 carbon atoms such as a methoxy group, an ethoxy group, a propoxy group, and a butoxy group; a hydroxy group; an acetoxy group; a chlorine atom; and an isocyanate group; and an alkoxy group and an isocyanate group are preferable.

The alkoxy group included in the trialkoxysilyloxy group for $X^{a1}$ and $X^{a2}$ may be the same or different, and examples thereof include alkoxy groups having 1 to 4 carbon atoms such as a methoxy group, an ethoxy group, a propoxy group, and a butoxy group. The trialkoxysilyloxy group for $X^{a1}$ and $X^{a2}$ is preferably a trimethoxysilyloxy group, and particularly preferably a triethoxysilyloxy group.

The hydrocarbon chain-containing group for $X^{a2}$ include a hydrocarbon chain and means a group in which the number of elements constituting the hydrocarbon chain is smaller than the number of elements of a chain or cyclic hydrocarbon and/or a chain or cyclic dialkylsiloxane which connect(s) a trialkylsilyl group with a hydrolyzable silicon group. The hydrocarbon chain-containing group is also preferably a group in which the number of carbon atoms of the longest straight chain of the hydrocarbon chain is smaller than the number of elements of a trialkylsilyl group-containing molecular chain. The hydrocarbon chain-containing group is usually composed only of a hydrocarbon group (hydrocarbon chain) and may be a group in which a part of methylene groups (—$CH_2$—) of the hydrocarbon chain are substituted with oxygen atoms, as necessary. The methylene groups (—$CH_2$—) adjacent to a Si atom are not substituted with oxygen atoms and continuous two methylene groups (—$CH_2$—) are not simultaneously substituted with oxygen atoms.

The carbon number of the hydrocarbon chain moiety means the number of carbon atoms constituting a hydrocarbon group (hydrocarbon chain) in the case of an oxygen-unsubstituted hydrocarbon chain-containing group, while the carbon number of the hydrocarbon chain moiety means the number of carbon atoms, which is counted with the assumption that an oxygen atom is considered as a methylene group (—$CH_2$—), in the case of an oxygen-substituted hydrocarbon chain-containing group.

Hereinafter, the hydrocarbon chain-containing group will be described by way of an oxygen-unsubstituted hydrocarbon chain-containing group (i.e., monovalent hydrocarbon group) as an example unless otherwise specified, and a part of the methylene groups (—$CH_2$—) can be substituted with oxygen atoms in any description.

When the hydrocarbon chain-containing group is a hydrocarbon group, the number of carbon atoms thereof is preferably 1 to 3, and more preferably 1. The hydrocarbon chain-containing group (in the case of a hydrocarbon group) may be branched or linear. The hydrocarbon chain-containing group (in the case of a hydrocarbon group) is preferably a saturated or unsaturated aliphatic hydrocarbon chain-containing group, and more preferably a saturated aliphatic hydrocarbon chain-containing group. The saturated aliphatic hydrocarbon chain-containing group (in the case of a hydrocarbon group) is more preferably an alkyl group such as a methyl group, an ethyl group, or a propyl group.

Examples of the group in which a part of methylene groups (—$CH_2$—) of the saturated aliphatic hydrocarbon group are substituted with oxygen atoms include a group including a (poly)ethylene glycol unit or the like.

The siloxane backbone-containing group for $X^{a2}$ may be a group which includes a siloxane unit (Si—O—) and is composed of elements in the number smaller than the number of elements constituting a chain or cyclic hydrocarbon and/or a chain or cyclic dialkylsiloxane which connect(s) a trialkylsilyl group with a hydrolyzable silicon group. Whereby, the siloxane backbone-containing group becomes a group which has a shorter length or a smaller three-dimensional figure (bulkiness) as compared to the trialkylsilyl group-containing molecular chain.

The siloxane backbone-containing group preferably has a chain form or may be either linear or branched. In the siloxane backbone-containing group, a siloxane unit (Si—O—) is preferably a dialkylsilyloxy group. Examples of the dialkylsilyloxy group include a dimethylsilyloxy group, a diethylsilyloxy group and the like. The number of repeating siloxane units (Si—O—) is preferably 1 or more, preferably 5 or less, and more preferably 3 or less.

The siloxane backbone-containing group may include a divalent hydrocarbon group in a part of the siloxane backbone. Specifically, a part of oxygen atoms in the siloxane backbone may be substituted with divalent hydrocarbon groups. Examples of the divalent hydrocarbon group with which a part of oxygen atoms in the siloxane backbone may be substituted include groups which are the same as the divalent hydrocarbon groups with which a part of oxygen atoms of the dialkylsiloxane chain included in the trialkylsilyl group-containing molecular chain may be substituted.

The silicon atom at the end (free end) of the siloxane backbone-containing group may have, in addition to a hydrolyzable group for forming a siloxane unit (Si—O—) with an adjacent silicon atom or the like, a hydrocarbon group (preferably an alkyl group) or the like. In this case, the siloxane backbone-containing group has a trialkylsilyl group and the siloxane backbone-containing group may exhibit a function as a spacer if the number of elements is smaller than those of the coexisting trialkylsilyl group-containing molecular chain. The alkyl group of the trialkylsilyl group may be substituted with a fluoroalkyl group when a trialkylsilyl group is included in the siloxane backbone-containing group.

Furthermore, the number of elements of the siloxane backbone-containing group is preferably 100 or less, more preferably 50 or less, and still more preferably 30 or less, and the number of elements thereof is usually 10 or more. A difference in the number of elements between the trialkylsilyl group-containing molecular chain and the siloxane backbone-containing group is preferably 10 or more, and more preferably 20 or more, and the difference is usually preferably 1000 or less, more preferably 500 or less, and still more preferably 200 or less.

The siloxane backbone-containing group is preferably a group represented by formula (x1):

[Chemical Formula 9]

$$*-(O-Si(R^{x9})_2)_{n5}-O-Si(R^{x8})_3 \quad (x1)$$

wherein, in formula (x1), plural $R^{x8}$(s) each independently represents a hydrocarbon group or a hydroxy group, $R^{x9}$ each independently represents an alkyl group having 1 to 4 carbon atoms, n5 represents an integer of 0 or more and 4 or less, and * represents a bond with a silicon atom.

Examples of the hydrocarbon group for $R^{x8}$ in the formula (x1) include groups which are the same as those shown as examples of the hydrocarbon group for $R^{x1}$, and the hydrocarbon group is preferably an aliphatic hydrocarbon group, and more preferably a linear alkyl group such as a methyl group, an ethyl group, a propyl group, or a butyl group.

$R^{x8}$ is preferably a hydrocarbon group. The methylene group included in the hydrocarbon group for $R^{x8}$ may be substituted with an oxygen atom.

Examples of the alkyl group having 1 to 4 carbon atoms for $R^{x9}$ in the formula (x1) include groups which are the same as those shown as $R^{s1}$ in formula (Ia). n5 is preferably an integer of 0 or more and 3 or less.

Examples of the siloxane backbone-containing group include groups represented by the following formulas:

[Chemical Formula 10]

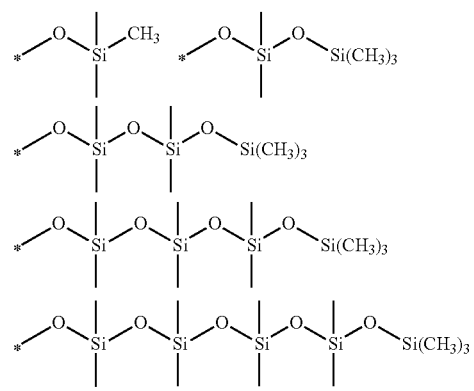

$X^{a1}$ is preferably an alkoxy group or a trialkoxysilyloxy group.

$X^{a2}$ is preferably a hydrolyzable group or a trialkoxysilyloxy group, and preferably an alkoxy group or a trialkoxysilyloxy group.

n2 is preferably an integer of 2 or more and 10 or less, and more preferably an integer of 1 or more and 8 or less.

n3 is preferably an integer of 2 or more and 4 or less.

n4 is preferably an integer of 0 or more and 4 or less.

X is preferably a group represented by the following formula. In the formula, $X^{a3}$ represents a hydrolyzable group or a trialkoxysilyloxy group, n6 represents an integer of 2 to 10, n7 represents an integer of 1 to 20, n8 represents an integer of 1 to 20, and * represents a bond with Y.

[Chemical Formula 11]

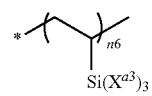

(X-1-1)

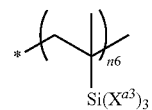

(X-1-2)

[Chemical Formula 12]
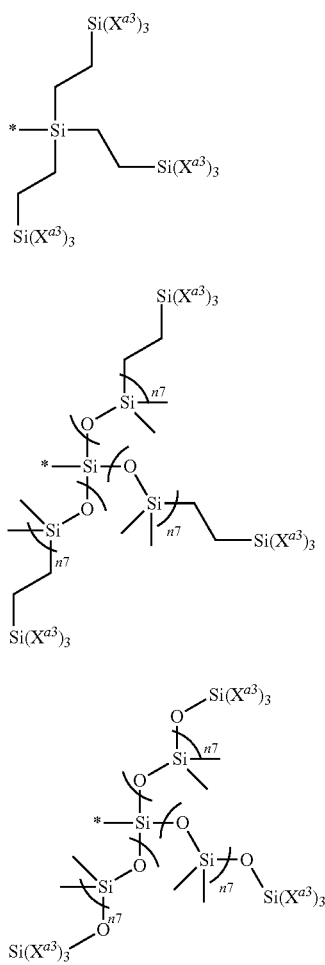
(X-2-1)
(X-2-2)
(X-2-3)
[Chemical Formula 13]
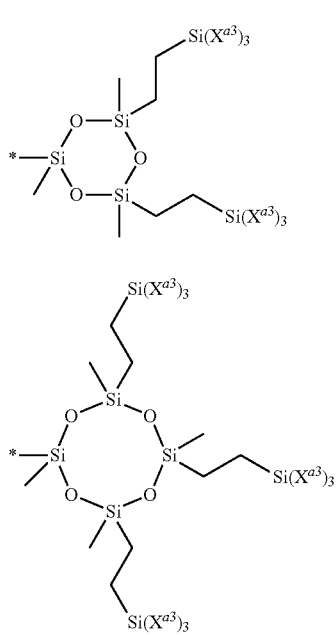
(X-3-1)
(X-3-2)
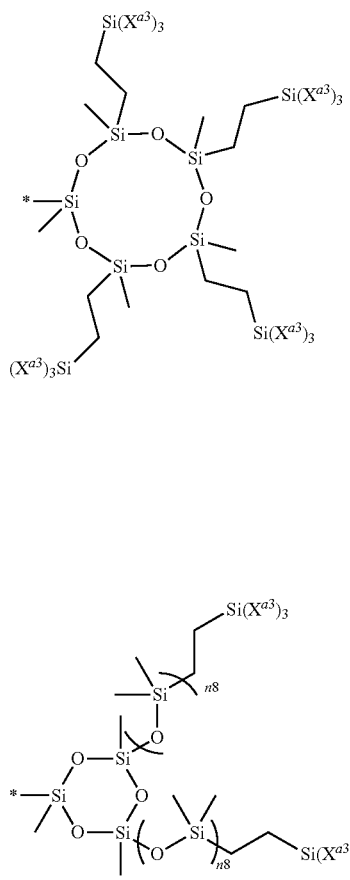
(X-3-3)
(X-3-4)
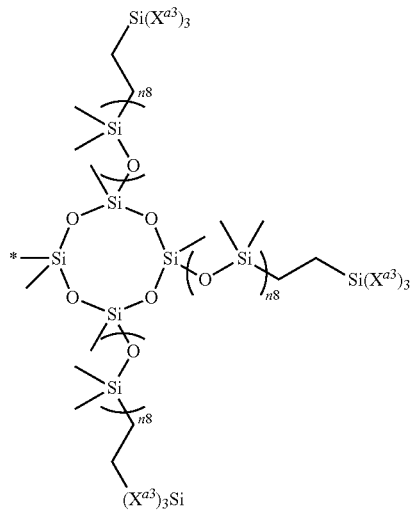
(X-3-5)

-continued

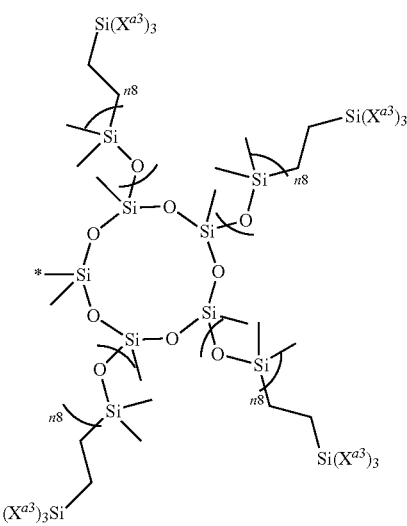
(X-3-6)

The organosilicon compound (a) is preferably a compound represented by formula (Ia-1):

[Chemical Formula 14]

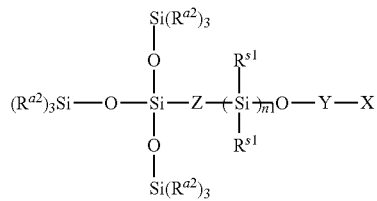
(Ia-1)

wherein, in formula (Ia-1), Y, Z, $R^{s1}$, and n1 are as defined above, $R^{a2}$ each independently represents an alkyl group having 1 to 4 carbon atoms, and X represents a group represented by any one of formulas (X-1) to (X-3):

[Chemical Formula 15]

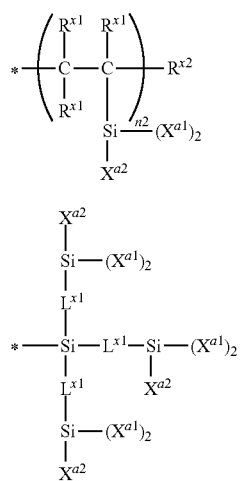

wherein, in formulas (X-1) to (X-3), $L^{x1}$ to $L^{x3}$, $R^{x1}$ to $R^{x8}$, $B^{x1}$ to $B^{x3}$, $X^{a1}$ to $X^{a2}$, and n2 to n4 are the same as defined above.

The number of carbon atoms of the alkyl group for $R^{a2}$ is preferably 1 to 3, more preferably 1 to 2, and particularly preferably 1. Examples of the alkyl group for $R^{a2}$ include a methyl group, an ethyl group, a propyl group and the like.

Examples of the organosilicon compound (a) include a compound represented by the following formula. n20 is preferably an integer of 1 to 30, and more preferably an integer of 1 to 20.

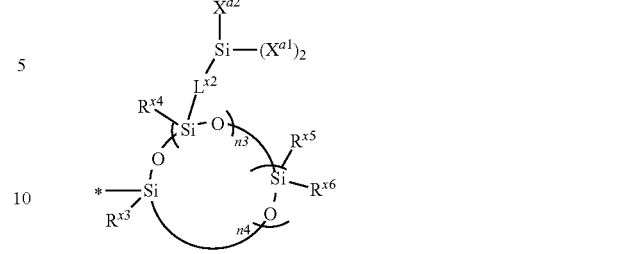

[Chemical Formula 16]

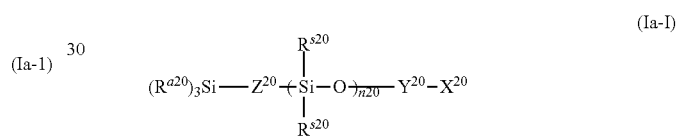
(Ia-I)

TABLE 1

| Compound name | $R^{a20}$ | $Z^{20}$ | $R^{s20}$ | $Y^{20}$ | $X^{20}$ |
|---|---|---|---|---|---|
| Ia-I-1 | Me | *—O—* | Me | — | (X-1-1) |
| Ia-I-2 | Me | *—O—* | Me | (Y1) | (X-1-1) |
| Ia-I-3 | Me | *—O—* | Me | (Y2) | (X-1-1) |
| Ia-I-4 | Me | *—O—* | Me | (Y3) | (X-1-1) |
| Ia-I-5 | Me | *—O—* | Me | (Y4) | (X-2-1) |
| Ia-I-6 | TMS | *—O—* | Me | — | (X-2-1) |
| Ia-I-7 | TMS | *—O—* | Me | (Y1) | (X-2-1) |
| Ia-I-8 | TMS | *—O—* | Me | (Y2) | (X-1-1) |
| Ia-I-9 | TMS | *—O—* | Me | (Y3) | (X-1-1) |
| Ia-I-10 | TMS | *—O—* | Me | (Y4) | (X-1-1) |
| Ia-I-11 | Me | *—O—* | Me | — | (X-1-2) |
| Ia-I-12 | Me | *—O—* | Me | (Y2) | (X-1-2) |
| Ia-I-13 | TMS | *—O—* | Me | — | (X-1-2) |
| Ia-I-14 | TMS | *—O—* | Me | (Y2) | (X-1-2) |
| Ia-I-15 | Me | *—O—* | Me | — | (X-2-1) |
| Ia-I-16 | Me | *—O—* | Me | (Y1) | (X-2-1) |
| Ia-I-17 | Me | *—O—* | Me | (Y2) | (X-2-1) |
| Ia-I-18 | Me | *—O—* | Me | (Y3) | (X-2-1) |
| Ia-I-19 | Me | *—O—* | Me | (Y4) | (X-2-1) |
| Ia-I-20 | TMS | *—O—* | Me | — | (X-2-1) |
| Ia-I-21 | TMS | *—O—* | Me | (Y1) | (X-2-1) |
| Ia-I-22 | TMS | *—O—* | Me | (Y2) | (X-2-1) |
| Ia-I-23 | TMS | *—O—* | Me | (Y3) | (X-2-1) |
| Ia-I-24 | TMS | *—O—* | Me | (Y4) | (X-2-1) |
| Ia-I-25 | Me | *—O—* | Me | — | (X-2-2) |
| Ia-I-26 | Me | *—O—* | Me | (Y2) | (X-2-2) |
| Ia-I-27 | TMS | *—O—* | Me | — | (X-2-2) |
| Ia-I-28 | TMS | *—O—* | Me | (Y2) | (X-2-2) |
| Ia-I-29 | Me | *—O—* | Me | — | (X-2-3) |
| Ia-I-30 | Me | *—O—* | Me | (Y2) | (X-2-3) |
| Ia-I-31 | TMS | *—O—* | Me | — | (X-2-3) |
| Ia-I-32 | TMS | *—O—* | Me | (Y2) | (X-2-3) |
| Ia-I-33 | Me | *—O—* | Me | — | (X-3-1) |

TABLE 1-continued

| Compound name | $R^{a20}$ | $Z^{20}$ | $R^{s20}$ | $Y^{20}$ | $X^{20}$ |
|---|---|---|---|---|---|
| Ia-I-34 | Me | *—O—* | Me | (Y2) | (X-3-1) |
| Ia-I-35 | TMS | *—O—* | Me | — | (X-3-1) |
| Ia-I-36 | TMS | *—O—* | Me | (Y2) | (X-3-1) |
| Ia-I-37 | Me | *—O—* | Me | — | (X-3-2) |
| Ia-I-38 | Me | *—O—* | Me | (Y1) | (X-3-2) |
| Ia-I-39 | Me | *—O—* | Me | (Y2) | (X-3-2) |
| Ia-I-40 | Me | *—O—* | Me | (Y3) | (X-3-2) |
| Ia-I-41 | Me | *—O—* | Me | (Y4) | (X-3-2) |
| Ia-I-42 | TMS | *—O—* | Me | — | (X-3-2) |
| Ia-I-43 | TMS | *—O—* | Me | (Y1) | (X-3-2) |
| Ia-I-44 | TMS | *—O—* | Me | (Y2) | (X-3-2) |
| Ia-I-45 | TMS | *—O—* | Me | (Y3) | (X-3-2) |
| Ia-I-46 | TMS | *—O—* | Me | (Y4) | (X-3-2) |
| Ia-I-47 | Me | *—O—* | Me | — | (X-3-3) |
| Ia-I-48 | Me | *—O—* | Me | (Y2) | (X-3-3) |
| Ia-I-49 | TMS | *—O—* | Me | — | (X-3-3) |
| Ia-I-50 | TMS | *—O—* | Me | (Y2) | (X-3-3) |
| Ia-I-51 | Me | *—O—* | Me | — | (X-3-4) |
| Ia-I-52 | Me | *—O—* | Me | (Y2) | (X-3-4) |
| Ia-I-53 | TMS | *—O—* | Me | — | (X-3-4) |
| Ia-I-54 | TMS | *—O—* | Me | (Y2) | (X-3-4) |
| Ia-I-55 | Me | *—O—* | Me | — | (X-3-5) |
| Ia-I-56 | Me | *—O—* | Me | (Y2) | (X-3-5) |
| Ia-I-57 | TMS | *—O—* | Me | — | (X-3-5) |
| Ia-I-58 | TMS | *—O—* | Me | (Y2) | (X-3-5) |
| Ia-I-59 | Me | *—O—* | Me | — | (X-3-6) |
| Ia-I-60 | Me | *—O—* | Me | (Y2) | (X-3-6) |
| Ia-1-61 | TMS | *—O—* | Me | — | (X-3-6) |
| Ia-I-62 | TMS | *—O—* | Me | (Y2) | (X-3-6) |

In the table, Me means a methyl group and TMS means a trimethylsilyloxy group. (Y1) to (Y4) each independently represents groups represented by the following formulas.

[Chemical Formula 17]

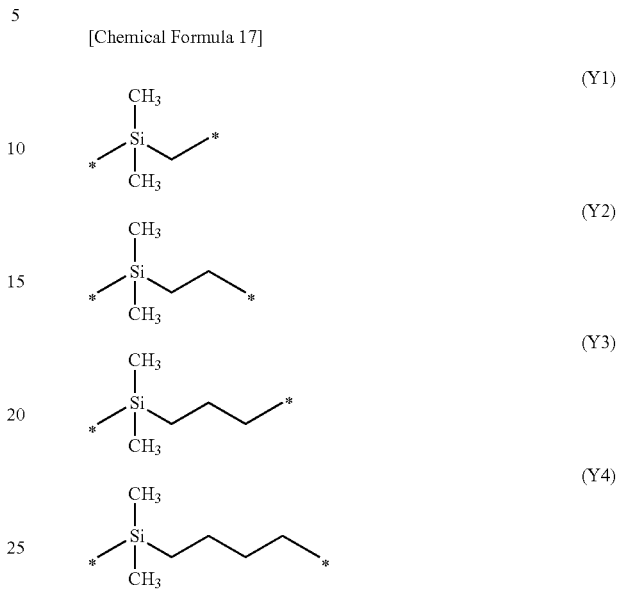

The organosilicon compound (a) of the present invention can be synthesized, for example, by the scheme shown in the following formula:

[Chemical Formula 18]

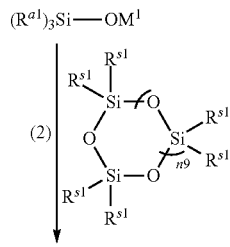

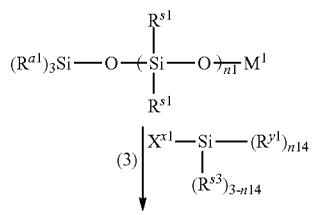

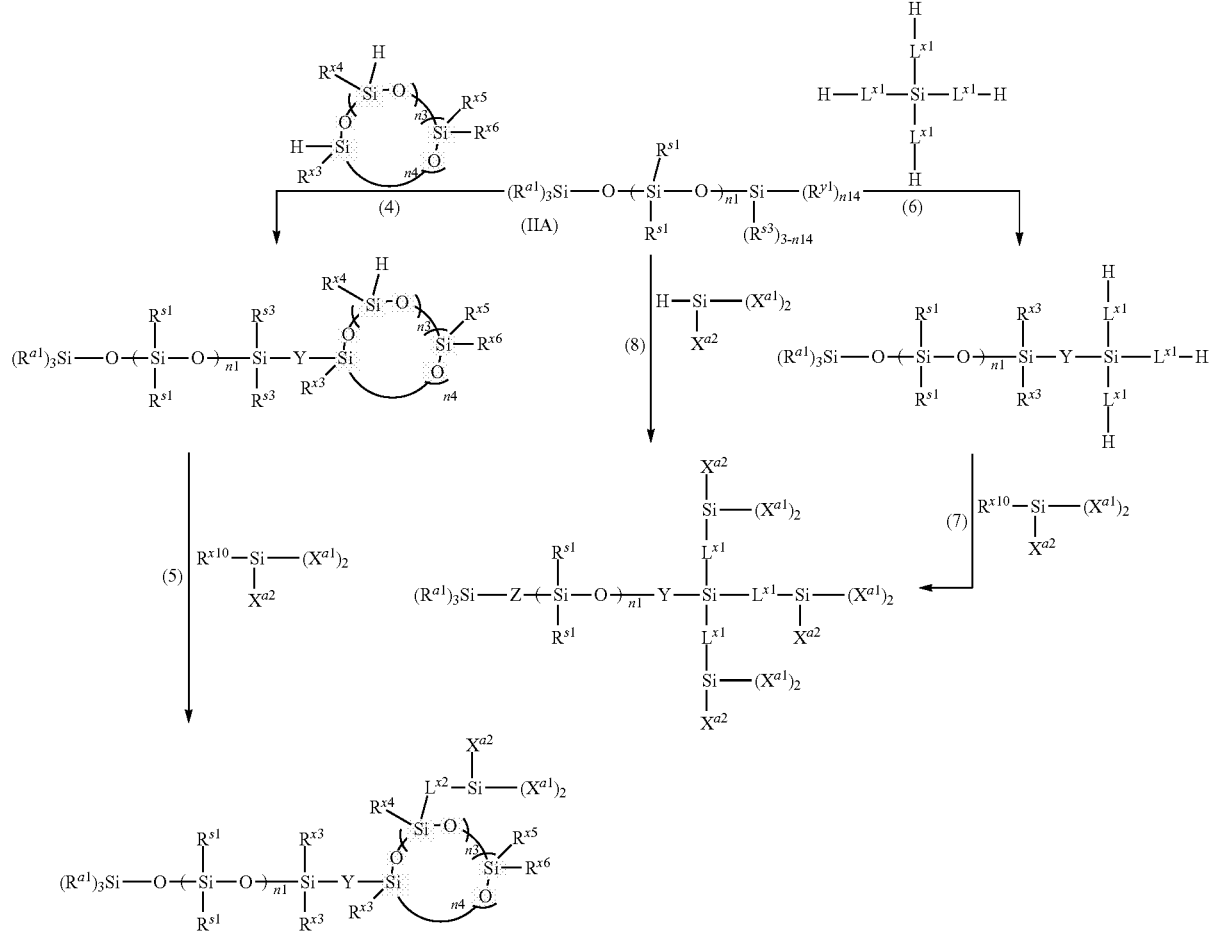

wherein, $L^{x1}$, $L^{x2}$, $R^{a1}$, $R^{s1}$, $R^{x3}$, $R^{x4}$, $R^{x5}$, $R^{x6}$, $X^{a1}$, $X^{a2}$, Y, n1, n3, n4 are the same as defined above, $R^{s3}$ represents an alkyl group having 1 to 4 carbon atoms, $R^{y1}$ and $R^{x10}$ each independently represents an alkenyl group having 2 to 10 carbon atoms, $X^{x1}$ represents a halogen atom, n9 represents an integer of 1 to 3, n14 represents an integer of 1 or more and 3 or less, R represents an alkyl group and $M^1$ represents an alkali metal.

Examples of the alkyl group having 1 to 4 carbon atoms for $R^{s3}$ include groups which are the same as the alkyl groups for $R^{a2}$, and the number of carbon atoms of the alkyl group for $R^{s3}$ is preferably 1 to 3, more preferably 1 to 2, and particularly preferably 1. Examples of the alkyl group for $R^{s3}$ include a methyl group, an ethyl group, a propyl group and the like.

The number of carbon atoms of the alkenyl group for $R^{y1}$ and $R^{x10}$ is preferably 2 to 5, more preferably 2 to 3, and particularly preferably 2. Examples of the alkenyl group for $R^{y1}$ and $R^{x10}$ include a vinyl group, a propenyl group, a butenyl group, a pentenyl group and the like.

Namely, when the organosilicon compound (a) is produced, for example, a compound having a trialkylsilyl group and $M^1O$— group ($M^1$ represents an alkali metal) (hereinafter referred to as "alkali metal oxide") is reacted with a cyclic dimethylsiloxane (step (2)), followed by a reaction with a silicon compound in which halogen atoms and alkenyl groups are bonded to silicon atoms (step (3)). A carbon-carbon double bond derived from the alkenyl group of the compound thus obtained is reacted with a silicon compound having a cyclic alkylsiloxane or a dialkylsilyl group (steps (4) and (6)), followed by a reaction with a silicon compound in which at least one alkenyl group and at least one hydrolyzable group are bonded to silicon atoms, or at least one hydrogen atom and at least one hydrolyzable group are bonded to silicon atoms (steps (5), (7), and (8)), and thus the organosilicon compound (a) can be produced.

The compound represented by the following formula obtained by the step (3) is also included in the scope of the present invention:

[Chemical Formula 19]

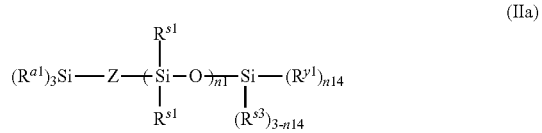

(IIa)

wherein, in formula (IIa), $R^{a1}$, $R^{s1}$, $R^{s3}$, $R^{y1}$, Z, n1, and n14 are the same as defined above.

Among the compounds represented by formula (IIa), a compound represented by the following formula (IIa-1) is preferable:

[Chemical Formula 20]

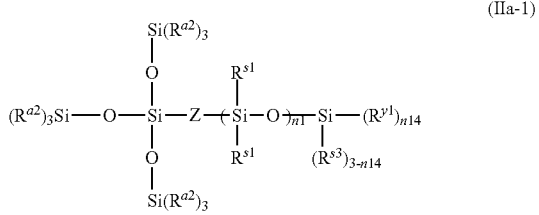

(IIa-1)

wherein, in formula (IIa-1), $R^{a2}$, $R^{s1}$, $R^{s3}$, $R^{y1}$, Z, n1, n14 are the same as defined above.

The alkali metal oxide can be produced, for example, by reacting a compound having a tris(trialkylsilyloxy)silyl group and a hydroxy group with an organic alkali metal compound (R-$M^1$) (step (1)). The alkali metal in $M^1$ of the organic alkali metal compound (R-$M^1$) is preferably lithium, and examples of the organic alkali metal compound (R-$M^1$) include alkyllithiums such as n-butyllithium, sec-butyllithium, and tert-butyllithium, and n-butyllithium is particularly preferable.

Examples of the halogen atom for $X^{x1}$ include a fluorine atom, a chlorine atom, a bromine atom, an iodine atom and the like, and a chlorine atom is preferable.

In the steps (4) to (7), a catalyst may coexist. Examples of the catalyst include chloroplatinic acid, platinum(0)-1,3-divinyl-1,1,3,3-tetramethyldisiloxane complex, tetrakis(triphenylphosphine)platinum(0), dichlorobis(triphenylphosphine)platinum(II), dichlorobis(acetonitrile)platinum(II), dichlorobis(benzonitrile)platinum(II), dichloro(1,5-cyclooctadiene)platinum and the like.

In the metal compound (b) included in the composition of the present invention, at least one hydrolyzable group is boned to a metal atom. It is preferred that the metal compound (b) has not a bulky group as compared to the organosilicon compound (a). Whereby, the structure derived from the metal compound (b) substantially functions as a spacer, thus enabling enhancement in water repellency of the coating film thus obtained.

The metal compound (b) is preferably a compound represented by formula (Ib-1) or formula (Ib-2), and more preferably a compound represented by formula (Ib-1):

[Chemical Formula 21]

(Ib-1)

wherein, in formula (Ib-1), $R^{b1}$ represents a siloxane backbone-containing group, a hydrocarbon chain-containing group, a hydrolyzable group, or a carbon fluoride-containing group, plural $X^{b1}$(s) each independently represents a hydrolyzable group, $X^{b2}$ represents a siloxane backbone-containing group, a hydrocarbon chain-containing group, or a hydrolyzable group, $R^{b1}$ and $X^{b2}$ may be the same or different when $R^{b1}$ and $X^{b2}$ are siloxane backbone-containing groups or hydrocarbon chain-containing groups, $R^{b1}$ and $X^{b1}$ may be the same or different when $X^{b2}$ is a hydrolyzable group, $R^{b1}$ and $X^{b2}$ may be the same or different between plural formulas (Ib-1), M represents a trivalent or tetravalent metal atom capable of forming a metal alkoxide, and m1 represents an integer of 0 or 1 depending on M; and

[Chemical Formula 22]

(Ib-2)

wherein, in the formula (Ib-2), $R^{b3}$ represents a hydrolyzable silane oligomer residue, $X^{b3}$ represents a hydrolyzable group, a fluorine-containing alkyl group having 1 to 4 carbon atoms, or an alkyl group having 1 to 4 carbon atoms.

Metalloids such as Si and Ge are also included in the metal for M in formula (Ib-1). Specific examples of M include trivalent metals such as Al, Fe, and In, tetravalent metals such as Hf, Si, Ti, Sn, and Zr and the like. M is preferably trivalent metal or tetravalent metal, more preferably trivalent metal such as Al, Fe, or In, and tetravalent metal such as Hf, Si, Ti, Sn, or Zr, still more preferably Al, Si, Ti, or Zr, and particularly preferably Si.

Examples of the hydrolyzable group for $R^{b1}$, $X^{b1}$, and $X^{b2}$ in formula (Ib-1) include those which are the same as the hydrolyzable groups of the organosilicon compound (a), and the hydrolyzable group is preferably an alkoxy group or an isocyanate group, more preferably an alkoxy group having 1 to 4 carbon atoms, and still more preferably an alkoxy group having 1 to 2 carbon atoms. The hydrolyzable group of the organosilicon compound (a) and the metal compound (b) may be the same or different and is preferably the same. Any of the hydrolyzable group of the organosilicon compound (a) and the metal compound (b) is preferably an alkoxy group having 1 to 4 carbon atoms, and the number of carbon atoms of the alkoxy group is more preferably 1 to 2.

The number of the hydrolyzable group among $R^{b1}$, $X^{b1}$, and $X^{b2}$ of formula (Ib-1) is preferably 1 or more, more preferably 2 or more, and still more preferably 3 or more, and the number of the hydrolyzable group is preferably 4 or less.

The number of elements of the siloxane backbone-containing group and the hydrocarbon chain-containing group for $R^{b1}$ and $X^{b2}$ or the carbon fluoride-containing group for $R^{b1}$ in formula (Ib-1) is preferably smaller than the number of elements of a chain or cyclic hydrocarbon and/or a chain or cyclic dialkylsiloxane which connect(s) a trialkylsilyl group with a hydrolyzable silicon group of the organic compound (a). The number of carbon atoms of the longest straight chain included in the siloxane backbone-containing group and the hydrocarbon chain-containing group for $R^{b1}$ and $X^{b2}$ or the carbon fluoride-containing group for $R^{b1}$ is preferably smaller than the number of elements of the trialkylsilyl group-containing molecular chain. Whereby, it is made possible for the structure derived from the metal compound (b) to function as a spacer.

Examples of the siloxane backbone-containing group for $R^{b1}$ and $X^{b2}$ include groups which are the same as the siloxane backbone-containing groups for $X^{a2}$.

Examples of the hydrocarbon chain-containing group for $R^{b1}$ and $X^{b2}$ include groups which are the same as the hydrocarbon chain-containing groups for $X^{a2}$.

The carbon fluoride-containing group for $R^{b1}$ in formula (Ib-1) is preferably a group having a fluoroalkyl group at the end, and particularly preferably a group the end of which is a trifluoromethyl group. The carbon fluoride-containing group is preferably a group represented by formula (f1):

[Chemical Formula 23]

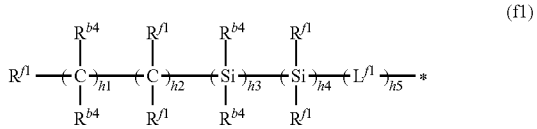

wherein, in formula (f1), $R^{f1}$ each independently represents a fluorine atom, or an alkyl group having 1 to 20 carbon atoms substituted with one or more fluorine atoms, $R^{b4}$ each independently represents a hydrogen atom or an alkyl group having 1 to 4 carbon atoms, $L^{f1}$ each independently represents —O—, —COO—, —OCO—, —NR$^{f2}$—, —NR$^{f2}$CO—, or —CONR$^{f2}$— ($R^{f2}$ is a hydrogen atom or a lower alkyl group, or a lower fluorine-containing alkyl group), h1 to h5 each independently represents an integer of 0 or more and 100 or less, and the total value of h1 to h5 is 100 or less, the order of each repeating unit enclosed in parentheses attached with h1 to h5 is arbitrary in the formula, and

* represents a bond with M.

$R^{f1}$ is preferably a fluorine atom or a perfluoroalkyl group having 1 to 10 carbon atoms (more preferably 1 to 5 carbon atoms). $R^{b4}$ is preferably a hydrogen atom or an alkyl group having 1 to 4 carbon atoms. $L^{f1}$ is preferably —O—, —COO—, or —OCO—. h1 is preferably 1 or more and 30 or less, more preferably 1 or more and 25 or less, still more preferably 1 or more and 10 or less, particularly preferably 1 or more and 5 or less, and most preferably 1 or 2. h2 is preferably 0 or more and 15 or less, and more preferably 0 or more and 10 or less. h3 is preferably 0 or more and 5 or less, and more preferably 0 or more and 2 or less. h4 is preferably 0 or more and 4 or less, and more preferably 0 or more and 2 or less. h5 is preferably 0 or more and 4 or less, and more preferably 0 or more and 2 or less. The total value of h1 to h5 is preferably 3 or more, and more preferably 5 or more, and the total value is preferably 80 or less, more preferably 50 or less, and still more preferably 20 or less.

It is particularly preferred that $R^{f1}$ is a fluorine atom or a perfluoroalkyl having 1 to 5 carbon atoms, $R^{b4}$ is a hydrogen atom, each of h3, h4, and h5 is 0, h1 is 1 or more and 5 or less, and h2 is 0 or more and 5 or less.

Examples of the carbon fluoride-containing group include $C_{r1}F_{2r1+1}$— (r1 is an integer of 1 to 12), $CF_3CH_2O(CH_2)_{r2}$—, $CF_3(CH_2)_{r3}Si(CH_3)_2(CH_2)_{r2}$—, and $CF_3COO(CH_2)_{r2}$— (each r2 is 5 to 20, and preferably 8 to 15, and r3 is 1 to 7, and preferably 2 to 6), and $CF_3(CF_2)_{r4}$—$(CH_2)_{r5}$— and $CF_3(CF_2)_{r4}$—$C_6H_4$— (each r4 is 1 to 10, and preferably 3 to 7, and each r5 is 1 to 5, and preferably 2 to 4) are also preferable.

Examples of the carbon fluoride-containing group include a fluoroalkyl group, a (fluoroalkoxy)alkyl group, a (fluoroalkylsilyl)alkyl group, a (fluoroalkylcarbonyloxy)alkyl group, a (fluoroalkyl)aryl group, a (fluoroalkyl)alkenyl group, a (fluoroalkyl)alkynyl group and the like.

Examples of the fluoroalkyl group include fluoroalkyl groups having 1 to 12 carbon atoms, such as a fluoromethyl group, a fluoroethyl group, a fluoropropyl group, a fluorobutyl group, a fluoropentyl group, a fluorohexyl group, a fluoroheptyl group, a fluorooctyl group, a fluorononyl group, a fluorodecyl group, a fluoroundecyl group, and a fluorododecyl group.

Examples of the (fluoroalkoxy)alkyl group include a (fluoromethoxy)$C_{5-20}$ alkyl group, a (fluoroethoxy)$C_{5-20}$ alkyl group, a (fluoropropoxy)$C_{5-20}$ alkyl group, a (fluorobutoxy)$C_{5-20}$ alkyl group and the like.

Examples of the (fluoroalkylsilyl)alkyl group include a (fluoromethylsilyl)$C_{5-20}$ alkyl group, a (fluoroethylsilyl)$C_{5-20}$ alkyl group, a (fluoropropylsilyl)$C_{5-20}$ alkyl group, a (fluorobutylsilyl)$C_{5-20}$ alkyl group, a (fluoropentylsilyl)$C_{5-20}$ alkyl group, a (fluorohexylsilyl)$C_{5-20}$ alkyl group, a (fluoroheptylsilyl)$C_{5-20}$ alkyl group, a (fluorooctylsilyl)$C_{5-20}$ alkyl group and the like.

Examples of the (fluoroalkylcarbonyloxy)alkyl group include a (fluoromethylcarbonyloxy)$C_{5-20}$ alkyl group, a (fluoroethylcarbonyloxy)$C_{5-20}$ alkyl group, a (fluoropropylcarbonyloxy)$C_{5-20}$ alkyl group, a (fluorobutylcarbonyloxy) $C_{5-20}$ alkyl group and the like.

Examples of the (fluoroalkyl)aryl group include a ($C_{1-8}$ fluoroalkyl)phenyl group and a ($C_{1-8}$ fluoroalkyl)naphthyl group, examples of the (fluoroalkyl)alkenyl group include a ($C_{1-17}$ fluoroalkyl)vinyl group, and examples of the (fluoroalkyl)alkynyl group include a ($C_{1-17}$ fluoroalkyl)ethynyl group.

Among them, $R^{b1}$ is preferably a siloxane backbone-containing group, a hydrocarbon chain-containing group, or a hydrolyzable group, more preferably a siloxane backbone-containing group or a hydrolyzable group, and still more preferably a hydrolyzable group.

$X^{b2}$ is preferably a siloxane backbone-containing group or a hydrolyzable group, and more preferably a hydrolyzable group.

The number of silicon atoms contained in the hydrolyzable silane oligomer residue for $R^{b3}$ in formula (Ib-2) is, for example, 3 or more, preferably 5 or more, and more preferably 7 or more. The condensation number is preferably 15 or less, more preferably 13 or less, and still more preferably 10 or less.

When the oligomer residue has an alkoxy group, examples of the alkoxy group include a methoxy group, an ethoxy group, a propoxy group, a butoxy group and the like, and a methoxy group and an ethoxy group are preferable. The oligomer residue can have one or more alkoxy groups, and preferably has one alkoxy group.

The hydrolyzable silane oligomer residue is preferably a group represented by formula (f2):

[Chemical Formula 24]

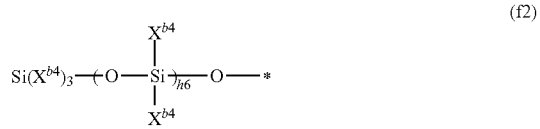

wherein, in the formula (f2), $X^{b4}$ each independently represents a hydrolyzable group or an alkyl group having 1 to 4 carbon atoms, or a fluorine-containing alkyl group having 1 to 4 carbon atoms, h6 is an integer of 0 or more and 100 or less, and

* represents a bond with Si.

The hydrolyzable group for $X^{b4}$ in formula (f2) is preferably an alkoxy group having 1 to 4 carbon atoms (preferably 1 to 2 carbon atoms) such as a methoxy group, an ethoxy group, a propoxy group, or a butoxy group, or an allyl group. h6 is preferably 0 or more and 10 or less, and more preferably 0 or more and 7 or less. At least one of X is also preferably a lower fluorine-containing alkyl group. At last one of X is preferably a hydrolyzable group (particularly a methoxy group, an ethoxy group, or an allyl group).

X is preferably a hydrolyzable group or a fluorine-containing alkyl group having 1 to 4 carbon atoms.

Examples of the hydrolyzable silane oligomer residue for $R^{b3}$ include $(C_2H_5O)_3Si—(OSi(OC_2H_5)_2)_4O—*$, $(CH_3O)_2(CF_3CH_2CH_2)Si—(OSi(OCH_3)(CH_2CH_2CF_3))_4—O—*$ and the like.

Examples of the hydrolyzable group for $X^{b3}$ in formula (Ib-2) include an alkoxy group having 1 to 4 carbon atoms (preferably 1 to 2 carbon atoms) such as a methoxy group, an ethoxy group, a propoxy group, or a butoxy group; a hydrogen atom; a cyano group; an allyl group; and an isocyanate group; and an alkoxy group is preferable, and an ethoxy group, a methoxy group, and an isocyanate group are particularly preferable.

$X^{b3}$ is preferably a hydrolyzable group, a fluorine-containing alkyl group having 1 to 4 carbon atoms, or O-oxide.

When M is Si, the metal compound (b) includes, for example, structures represented by the following formula (2-1) to formula (2-5). In the formulas, $X^{b5}$ each independently represents a hydrolyzable group (preferably an alkoxy group or an isocyanate group).

[Chemical Formula 25]

(2-1)

(2-2)

(2-3)

(2-4)

(2-5)

Among the metal compound (b), a compound having a carbon fluoride-containing group includes, for example, $CF_3—Si—(OCH_3)_3$ and $C_jF_{2j+1}—Si—(OC_2H_5)_3$ (j is an integer of 1 to 12). Among them, $C_4F_9—Si—(OC_2H_5)_3$, $C_6F_{13}—Si—(OC_2H_5)_3$, $C_7F_{15}—Si—(OC_2H_5)_3$, and $C_8F_{17}—Si—(OC_2H_5)_3$ are preferable. It is also possible to exemplify $CF_3CH_2O(CH_2)_kSiCl_3$, $CF_3CH_2O(CH_2)_k Si(OCH_3)_3$, $CF_3CH_2O(CH_2)_k Si(OC_2H_5)_3$, $CF_3(CH_2)_2Si(CH_3)_2(CH_2)_kSiCl_3$, $CF_3(CH_2)_2Si(CH_3)_2(CH_2)_kSi(OCH_3)_3$, $CF_3(CH_2)_2Si(CH_3)_2(CH_2)_kSi(OC_2H_5)_3$, $CF_3(CH_2)_6Si(CH_3)_2 (CH_2)_kSiCl_3$, $CF_3(CH_2)_6Si(CH_3)_2(CH_2)_kSi(OCH_3)_3$, $CF_3(CH_2)_6Si(CH_3)_2(CH_2)_kSi(OC_2H_5)_3$, $CF_3COO(CH_2)_k SiCl_3$, $CF_3COO(CH_2)_kSi(OCH_3)_3$, and $CF_3COO(CH_2)_kSi(OC_2H)_3$ (each k is 5 to 20, and preferably 8 to 15). It is also possible to exemplify $CF_3(CF_2)_m—(CH_2)_nSiCl_3$, $CF_3(CF_2)_m—(CH_2)_nSi(OCH_3)_3$, and $CF_3(CF_2)_m—(CH_2)_nSi(OC_2H_5)_3$ (each m is 1 to 10, and preferably 3 to 7, and each n is 1 to 5, and preferably 2 to 4). It is also possible to exemplify $CF_3(CF_2)_p—(CH_2)_q—Si—(CH_2CH=CH_2)_3$ (each p is 2 to 10, and preferably 2 to 8, and each q is 1 to 5, and preferably 2 to 4).

It is possible to exemplify $CF_3(CF_2)_p—(CH_2)_qSiCH_3Cl_2$, $CF_3(CF_2)_p—(CH_2)_qSiCH_3 (OCH_3)_2$, and $CF_3(CF_2)_p—(CH_2)_qSiCH_3 (OC_2H_5)_2$ (each p is 2 to 10, and preferably 3 to 7, and each q is 1 to 5, and preferably 2 to 4).

Among the metal compound (b), examples of a compound represented by formula (Ib-2) (hereinafter sometimes referred to as "hydrolyzable silane oligomer") include $(H_5C_2O)_3—Si—(OSi(OC_2H_5)_2)_4OC_2H_5$, $Si(OCH_3)_2(CH_2CH_2CF_3)—(OSi(OCH_3)(CH_2CH_2CF_3))_4—OCH_3$ and the like.

In the composition of the present invention, a ratio of the metal compound (b) and the organosilicon compound (a) (metal compound (b)/organosilicon compound (a)) is preferably 0.1 or more, more preferably 1 or more, and still more preferably 2 or more, in terms of mol, and a ratio thereof is preferably 100 or less, more preferably 50 or less, still more preferably 30 or less, and yet more preferably 25 or less in terms of mol.

The content of the total amount of the organosilicon compound (a) and the metal compound (b) (the total amount of the organosilicon compound (a), the metal compound (b) and the below-mentioned solvent (c) when including the below-mentioned solvent (c)) in the composition is usually 50% by mass or less, preferably 25% by mass or less, more preferably 10% by mass or less, and still more preferably 8% by mass or less.

The composition of the present invention may include, in addition to the organosilicon compound (a) and the metal compound (b), the other organosilicon compound (a1) having at least one trialkylsilyl group and one hydrolyzable silicon group. Examples of the trialkylsilyl group and the hydrolyzable silicon group of the other organosilicon compound (a1) include groups which are the same as the trialkylsilyl group and the hydrolyzable silicon group of the organosilicon compound (a).

The other organosilicon compound (a1) is preferably a compound represented by formula (a1):

[Chemical Formula 26]

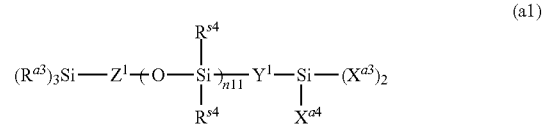
(a1)

wherein, in formula (a1), $Y^1$ represents an oxygen atom or a divalent hydrocarbon group having 1 to 10 carbon atoms, $Z^1$ represents a single bond or $-L^2-Si(R^{s5})_2—$, $R^{a3}$ each independently represents a hydrocarbon group or a trialkylsilyloxy group, and the hydrocarbon group represented by $R^{a3}$ is an alkyl group when all $R^{a3}$(s) are hydrocarbon groups, $R^{s4}$, $R^{s5}$ each independently represents a hydrocarbon group having 1 to 10 carbon atoms, $L^{s2}$ represents a divalent hydrocarbon group having 1 to 10 carbon atoms, $X^{a3}$ each independently represents a hydrolyzable group or a trialkoxysilyloxy group, $X^{a4}$ each independently represents a trialkylsilyl group-containing molecular chain, a hydrocarbon chain-containing group, a siloxane backbone-containing group, a hydrolyzable group, or a trialkoxysilyloxy group, and $X^{a4}$ and $X^{a3}$ may be the same or different when $X^{a4}$ is a hydrolyzable group, and n11 represents an integer of 1 or more and 100 or less.

Examples of the divalent hydrocarbon group having 1 to 10 carbon atoms for $Y^1$ or $L^{s2}$ include groups which are the same as those shown as examples of the divalent hydrocarbon group having 1 to 10 carbon atoms for Z.

$Z^1$ is preferably a single bond.

Examples of $R^{a3}$ include groups which are the same as those shown as examples of $R^{a1}$, and an alkyl group or a trialkylsilyloxy group is preferable and a trialkylsilyl group is more preferable.

Examples of the alkyl group for $R^{s4}$ and $R^{s5}$ include groups which are the same as those shown as examples of $R^{s1}$ and $R^{s2}$. Examples of the dialkylsiloxane chain represented by $(-Si(R^{s4})_2-O-)_{n11}$ include a (poly)dimethylsiloxane chain, a (poly)diethylsiloxane chain and the like.

n11 is 1 or more, preferably 100 or less, more preferably 80 or less, still more preferably 50 or less, particularly preferably 20 or less, and most preferably 15 or less.

The number of elements constituting the longest straight chain included in $-Z^1-(Si(R^{s4})_2-O-)_{n11}-Y^1-$ is preferably 24 or more, more preferably 40 or more, and still more preferably 50 or more, and the number of elements is preferably 1,200 or less, more preferably 700 or less, and still more preferably 250 or less.

Examples of the organosilicon compound (a1) includes compounds represented by the following formulas. In the formulas, $X^{a6}$ represents a hydrolyzable group (particularly an alkoxy group having 1 to 4 carbon atoms), n12 represents an integer of 1 to 12, and n13 represents an integer of 1 to 4.

[Chemical Formula 27]

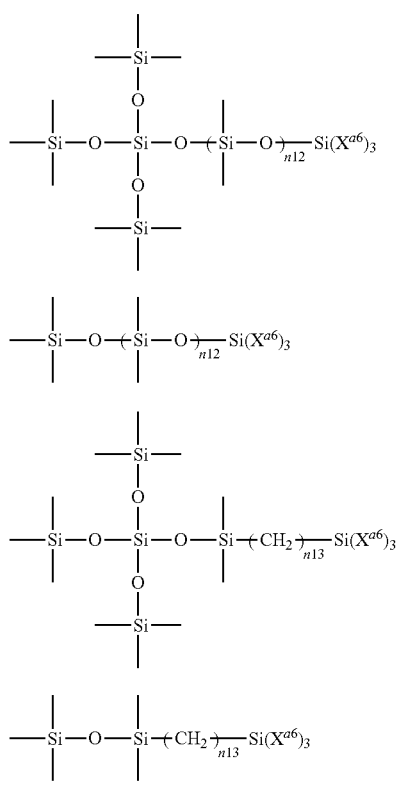

It is preferred that the composition of the present invention further includes a solvent (c). Examples of the solvent (c) include water; hydrophilic organic solvents such as alcohol-based solvents, ether-based solvents, ketone-based solvents, ester-based solvents, and amide-based solvent; and hydrophobic organic solvents such as aromatic hydrocarbon-based solvents and saturated hydrocarbon-based solvents. These solvents may be used alone, or two or more solvents may be used in combination.

Examples of the alcohol-based solvent include methanol, ethanol, propanol, isopropyl alcohol, butanol, ethylene glycol, propylene glycol, diethylene glycol and the like. Examples of the ether-based solvent include dimethoxyethane, tetrahydrofuran, dioxane and the like. Examples of the ketone-based solvent include acetone, methyl ethyl ketone and the like. Examples of the ester-based solvent include ethyl acetate, butyl acetate and the like. Examples of the amide-based solvent include dimethylformamide and the like. Examples of the aromatic hydrocarbon-based solvent include benzene, toluene, xylene and the like. Examples of the saturated hydrocarbon-based solvent include hexane, cyclohexane and the like.

Among them, alcohol-based solvents and ketone-based solvents are preferable, and water may be included.

When water is contained, the content of water in the solvent (c) is preferably 0.1% by mass or more, more preferably 5% by mass or more, and still more preferably 10% by mass or more, and the content of water is preferably 90% by mass or less, more preferably 70% by mass or less, and still more preferably 50% by mass or less.

The amount of the solvent (c) is preferably 0.1 part by mass or more, more preferably 5 parts by mass or more, still more preferably 10 parts by mass or more, and particularly preferably 12 parts by mass or more, based on 1 part by mass of the total amount of the organosilicon compound (a) and the metal compound (b), and the amount of the solvent is preferably 100 parts by mass or less, more preferably 80 parts by mass or less, and still more preferably 50 parts by mass or less, based on 1 part by mass of the total amount of the organosilicon compound (a) and the metal compound (b). If the amount of the solvent (c) is in the above range, it is easy to control the thickness of the coating film.

The composition of the present invention may further include a catalyst (d). The catalyst (d) may be any one as long as it can act as a hydrolysis catalyst of a hydrolyzable group bonded to silicon atoms, and examples thereof include acidic compounds; basic compounds; and organometal compounds. Examples of the acidic compound include inorganic acids such as hydrochloric acid and nitric acid; and organic acids such as acetic acid. Examples of the basic compound include ammonia, and amine and the like. Examples of the organometal compound include organometal compounds containing metal elements such as Al, Fe, Zn, Sn, and Zr as central metal, and examples thereof include organoaluminum compounds such as aluminum-acetylacetone complexes and aluminum-ethylacetoacetate complexes; organoiron compounds such as iron octylate; organozinc compounds such as zinc acetylacetonate monohydrate, zinc naphthenate, and zinc octylate; and organotin compounds such as dibutyltin diacetate complexes.

Among them, as the catalyst (d), inorganic acids and organometal compounds are preferable, and organoaluminum compounds and hydrochloric acid are more preferable.

The amount of the catalyst (d) is preferably 0.01 part by mass or more, more preferably 0.05 part by mass or more, and still more preferably 0.1 part by mass or more, based on 100 parts by mass of the total amount of the organosilicon compound (a) and the metal compound (b), and the amount of the catalyst is preferably 20 parts by mass or less, more preferably 10 parts by mass or less, and still more preferably 8 parts by mass or less, based on 100 parts by mass of the total amount of the organosilicon compound (a) and the metal compound (b).

As long as the effects of the present invention are not impaired, the composition of the present invention may contain various additives such as antioxidants, rust inhibitors, ultraviolet absorbers, photostabilizers, antifungal agents, antibacterial agents, organism adhesion preventing agents, deodorizers, pigments, flame retardants, and antistatic agents.

Examples of the antioxidant include phenol-based antioxidants, sulfur-based antioxidants, phosphorus-based antioxidants, hindered amine-based antioxidants and the like.

Examples of the phenol-based antioxidant include n-octadecyl-3-(4-hydroxy-3,5-di-t-butylphenyl)propionate, 2,6-di-t-butyl-4-methylphenol, 2,2-thio-diethylene-bis-[3-(3,5-di-t-butyl-4-hydroxyphenyl)propionate], tri-ethylene glycol-bis-[3-(3-t-butyl-5-methyl-4-hydroxyphenyl)propionate], 3,9-bis[2-{3-(3-t-butyl-4-hydroxy-5-methylphenyl)propionyloxy}-1,1-dimethylethyl]-2,4,8,10-tetraoxaspiro[5•5]undecane, tetrakis{3-(3,5-di-t-butyl-4-hydroxyphenyl)-propionic acid}pentaerythrityl esters, 2-t-butyl-6-(3-t-butyl-2-hydroxy-5-methylbenzyl)-4-methylphenyl acrylate, 2-[1-(2-hydroxy-3,5-di-t-pentylphenyl)ethyl]-4,6-di-t-pentylphenyl acrylate, 1,3,5-trimethyl-2,4,6-tris(3,5-di-t-butyl-4-hydroxybenzyl) benzene, tris(3,5-di-t-butyl-4-hydroxybenzyl)isocyanurate, 1,3,5-tris(4-t-butyl-3-hydroxy-2,6-dimethylbenzyl)-1,3,5-triazine-2,4,6-(1H,3H,5H)-trione, 2,2'-methylenebis(6-t-butyl-4-methylphenol), 4,4'-butylidenebis (6-t-butyl-3-methylphenol), 4,4'-thiobis(6-t-butyl-3-methylphenol) and the like.

Examples of the sulfur-based antioxidant include 3,3'-thiodipropionic acid di-n-dodecyl esters, 3,3'-thiodipropionic acid di-n-tetradecyl esters, 3,3'-thiodipropionic acid di-n-octadecyl esters, tetrakis(3-dodecylthiopropionic acid) pentaerythritol esters and the like.

Examples of the phosphorus-based antioxidant include tris(2,4-di-t-butylphenyl)phosphite, bis(2,4-di-t-butylphenyl)pentaerythritol diphosphite, bis(2,6-di-t-butyl-4-methylphenyl)pentaerythritol diphosphite, bis(2,4-di-cumylphenyl)pentaerythritol diphosphite, tetrakis(2,4-di-t-butylphenyl)-4,4'-biphenylene diphosphonite, bis-[2,4-di-t-butyl, (6-methyl)phenyl]ethyl phosphite and the like.

Examples of the hindered amine-based antioxidant include sebacic acid bis(2,2,6,6-tetramethyl-4-piperidyl) ester (melting point: 81 to 86° C.), 2,2,6,6-tetramethyl-4-piperidyl methacrylate (melting point: 58° C.), poly[{6-(1,1,3,3-tetramethylbutyl)amino-1,3,5-triazine-2,4-diyl}{(2,2,6,6-tetramethyl-4-piperidyl)imino}-1,6-hexamethylene{(2,2,6,6-tetramethyl-4-piperidyl)imino}] and the like.

Examples of the rust inhibitor include alkanolamines such as triethanolamine; quaternary ammonium salts; alkanethiol; azoles such as imidazoline, imidazole, alkylimidazoline derivatives, benzimidazole, 2-mercaptobenzimidazole, and benzotriazole; sodium metavanadate; bismuth citrate; phenol derivatives; amine compounds, for example, aliphatic amines such as alkylamine and polyalkenylamine, aromatic amines, ethoxylated amines, cyanoalkylamines, cyclohexylamine benzoate, aliphatic diamines such as alkylenediamines, aromatic diamines and the like; amides of the amine compounds and carboxylic acid; alkyl esters; pyrimidine; naphthenic acid; sulfonic acid composites; nitrous acid salts such as calcium nitrite, sodium nitrite, and dicyclohexylamine nitrite; polyol compounds such as polyalcohol and polyphenol; heteropolyacid salts such as sodium molybdate, sodium tungstate, sodium phosphonate, sodium chromate, and sodium silicate; gelatin; polymers of carboxylic acid; nitro compounds; formaldehyde; acetylene alcohol; thiol compounds such as aliphatic thiols, aromatic thiols, and acetylene thiols; sulfide compounds such as aliphatic sulfides, aromatic sulfides, and acetylene sulfides; sulfoxide compounds such as sulfoxide and dibenzylsulfoxide; thiourea; combinations of an amine or quaternary ammonium salt and halogen ions; combinations of an alkylamine and potassium iodide; combinations of tannin and sodium phosphate; combinations of triethanolamine and laurylsarcosine; combinations of triethanolamine, laurylsarcosine, and benzotriazole; and combinations of an alkylamine, benzotriazole, sodium nitrite, and sodium phosphate.

Examples of the ultraviolet absorber/photostabilizer include 2-(5-methyl-2-hydroxyphenyl)benzotriazole, 2-[2-hydroxy-3,5-bis($\alpha,\alpha$-dimethylbenzyl)phenyl]-2H-benzotriazole, 2-(3-t-butyl-5-methyl-2-hydroxyphenyl)-5-chlorobenzotriazole, 2-(2'-hydroxy-5'-t-octylphenyl) benzotriazole, condensates of methyl-3-[3-t-butyl-5-(2H-benzotriazol-2-yl)-4-hydroxyphenyl]propionate-polyethylene glycol (molecular weight: about 300), hydroxyphenylbenzotriazole derivatives, 2-(4,6-diphenyl-1,3,5-triazin-2-yl)-5[(hexyl)oxy]-phenol, 2-ethoxy-2'-ethyloxalic acid bisanilide and the like.

Examples of the antifungal agent/antibacterial agent include 2-(4-thiazolyl)benzimidazole, sorbic acid, 1,2-benzisothiazolin-3 one, (2-pyridylthio-1-oxide) sodium, dehydroacetic acid, 2-methyl-5-chloro-4-isothiazolone complexes, 2,4,5,6-tetrachlorophthalonitrile, methyl 2-benzimidazole carbamate, 1-(butylcarbamoyl)-methyl 2-benzimidazole carbamate, mono or dibromocyanoacetamides, 1,2-dibromo-2,4-dicyanobutane, 1,1-dibromo-1-nitropropanol and 1,1-dibromo-1-nitro-2-acetoxypropane and the like.

Examples of the organism adhesion preventing agent include tetramethylthiuram disulfide, bis(N,N-dimethyldithiocarbamic acid)zinc, 3-(3,4-dichlorophenyl)-1,1-dimethylurea, dichloro-N-((dimethylamino)sulfonyl)fluoro-N-(P-tolyl)methanesulfenamide, pyridine-triphenylborane, N,N-dimethyl-N'-phenyl-N'-(fluorodichloromethylthio) sulfamide, copper(I) thiocyanate, cuprous oxide, tetrabutylthiuram disulfide, 2,4,5,6-tetrachloroisophthalonitrile, zinc ethylenebisdithiocarbamate, 2,3,5,6-tetrachloro-4-(methylsulfonyl)pyridine, N-(2,4,6-trichlorophenyl)maleimide, bis(2-pyridinethiol-1-oxide)zinc salts, bis(2-pyridinethiol-1-oxide)copper salts, 2-methylthio-4-t-butylamino-6-cyclopropylamino-s-triazine, 4,5-dichloro-2-n-octyl-4-isothiazolin-3-one, furanones, alkylpyridine compounds, gramine-based compounds, isotonyl compounds and the like.

Examples of the deodorizer include organic acids such as lactic acid, succinic acid, malic acid, citric acid, maleic acid, malonic acid, ethylenediaminepolyacetic acid, alkane-1,2-dicarboxylic acid, alkene-1,2-dicarboxylic acid, cycloalkane-1,2-dicarboxylic acid, cycloalkene-1,2-dicarboxylic acid, and naphthalenesulfonic acid; fatty acid metals such as zinc undecylenate, zinc 2-ethylhexanoate, and zinc ricinoleate; metal compounds such as iron oxide, iron sulfate, zinc oxide, zinc sulfate, zinc chloride, silver oxide, copper oxide, metal (iron, copper, etc.) chlorophyllin sodium, metal (iron, copper, cobalt, etc.) phthalocyanine, metal (iron, copper, cobalt, etc.) tetrasulfonic acid phthalocyanine, titanium dioxide, and visible light-responsive titanium dioxide (nitrogen-doped type, etc.); cyclodextrins such as $\alpha$-, $\beta$-, or $\gamma$-cyclodextrin, methyl derivatives thereof, hydroxypropyl derivatives, glucosyl derivatives, and maltosyl derivatives; and porous materials, for example, acrylic acid-based polymers such as porous methacrylic acid polymers and porous acrylic acid polymers, aromatic polymers such as porous divinylbenzene polymers, porous styrene-divinylbenzenevinylpyridine polymers, and porous divinylbenzene-vinylpyridine polymers, copolymers thereof, chitin, chitosan, activated carbon, silica gel, activated alumina, zeolite, and ceramics.

Examples of the pigment include carbon black, titanium oxide, phthalocyanine-based pigments, quinacridone-based pigments, isoindolinone-based pigments, perylene or perynine-based pigments, quinophthalone-based pigments, diketopyrrolo-pyrrole-based pigments, dioxazine-based pigments, disazo-condensed-based pigments, benzimidazolone-based pigments and the like.

Examples of the flame retardant include decabromobiphenyl, antimony trioxide, phosphorus-based flame retardants, aluminum hydroxide and the like.

Examples of the antistatic agent include quaternary ammonium salt type cationic surfactants, betaine type amphoteric surfactants, alkyl phosphate type anionic surfactants; cationic surfactants such as primary amine salts, secondary amine salts, tertiary amine salts, quaternary amine salts, and pyridine derivatives; anionic surfactants such as sulfated oil, soap, sulfated ester oil, sulfated amide oil, sulfated ester salts of olefins, fatty alcohol sulfuric acid ester salts, alkylsulfuric acid ester salts, fatty acid ethyl sulfonic acid salts, alkylnaphthalene sulfonic acid salts, alkylbenzene sulfonic acid salts, succinic acid ester sulfonic acid salts, and phosphoric acid ester salts; nonionic surfactants such as partial fatty acid esters of polyhydric alcohols, ethylene oxide adducts of fatty alcohols, ethylene oxide adducts of fatty acids, ethylene oxide adducts of fatty amino or fatty acid amides, ethylene oxide adducts of alkylphenols, ethylene oxide adducts of partial fatty acid esters of polyhydric alcohols, and polyethylene glycol; and amphoteric surfactants such as carboxylic acid derivatives and imidazoline derivatives.

As additives, lubricants, fillers, plasticizers, nucleating agent, antiblocking agents, foaming agents, emulsifiers, brightening agents, binders and the like may further coexist.

When these additives are contained, the content of the additive in the composition is usually 0.1 to 70% by mass, preferably 0.1 to 50% by mass, more preferably 0.5 to 30% by mass, and still more preferably 2 to 15% by mass.

By bringing the composition into contact with a substrate in the air, hydrolyzable groups of the organosilicon compound (a) and the metal compound (b) are hydrolytically polycondensed to form a coating film. Since the coating film thus formed has a trialkylsilyl group derived from the organosilicon compound (a), friction between liquid droplet (water and oil droplets, etc.) and the coating film is reduced, thus making it easy for the liquid droplet to move and enhancing chemical/physical durability, leading to an improvement in heat resistance and light resistance. Meanwhile, the structure unit derived from the metal compound (b) having no trialkylsilyl group substantially functions as a spacer, thus enabling further enhancement in water repellency of the film.

Examples of a method for bringing the composition into contact with the substrate include a spin coating method, a dip coating method, a spray coating method, a roll coating method, a bar coating method, a die coating method and the like, and a spin coating method and a spray coating method are preferable. According to the spin coating method and the spray coating method, it is easy to form a coating film having a predetermined thickness.

In this case, the composition may be further diluted as necessary. The dilution ratio is, for example, 2 to 100 times, and preferably 5 to 50 times. It is possible to appropriately use, as the dilution solvent, solvents as shown as examples of the solvent (c).

The coating film as a cured product of the composition is also included in the scope of the present invention. The coating film has a network-like backbone in which silicon atoms and the metal atoms (preferably only silicon atoms) are bonded via oxygen atoms and has a structure (A) derived from the organosilicon compound (a) in which the trialkylsilyl group-containing molecular chain is bonded to a part of silicon atoms that form the backbone.

The structure (A) derived from the organosilicon compound (a) is preferably represented by the following formula (IA):

[Chemical Formula 28]

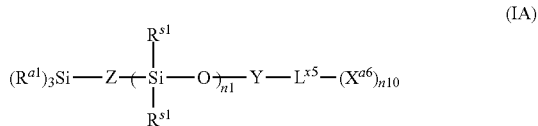

(IA)

wherein, in formula (IA), $R^{a1}$, Z, $R^{s1}$, Y, and n1 are the same as defined above, $L^{x5}$ represents a chain or cyclic hydrocarbon and/or a chain or cyclic dialkylsiloxane, n10 represents an integer of 2 or more, and $X^{a6}$ each independently represents a structure represented by the following formula:

[Chemical Formula 29]

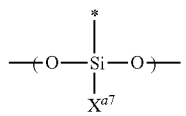

wherein $X^{a7}$ represents a hydrocarbon chain-containing group, a siloxane backbone-containing group, a trialkylsilyl group-containing molecular chain, or an —O— group, and * represents a bond with $L^{x5}$.

Examples of the hydrocarbon chain-containing group and the siloxane backbone-containing group for $X^{a7}$ include groups which are the same as the hydrocarbon chain-containing group and the siloxane backbone-containing group for $X^{a2}$. $X^{a7}$ is preferably a hydrocarbon chain-containing group, a siloxane backbone-containing group, or an —O— group, and particularly preferably an —O— group.

*-$L^{x5}$-$(X^{a6})_{n9}$ is preferably a group represented by the following formula:

[Chemical Formula 30]

(X-1)

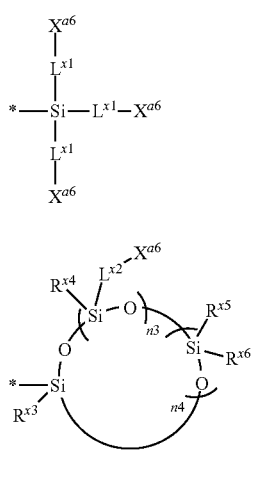

(X-2)

(X-3)

wherein $L^{x1}$ to $L^{x2}$, $R^{x1}$ to $R^{x7}$, $X^{a6}$, n2, n3, and n4 are the same as defined above.

Examples of $*\text{-}L^{x5}\text{-}(X^{a6})_{n9}$ include structures represented by the following formulas. In the formulas, n6 represents an integer of 2 to 10, n7 represents an integer of 1 to 20, n8 represents an integer of 1 to 20, and * represents a bond with Y.

[Chemical Formula 31]

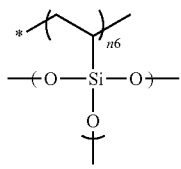

(x-1-1)

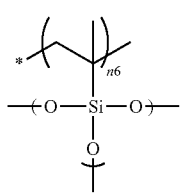

(x-1-2)

[Chemical Formula 32]

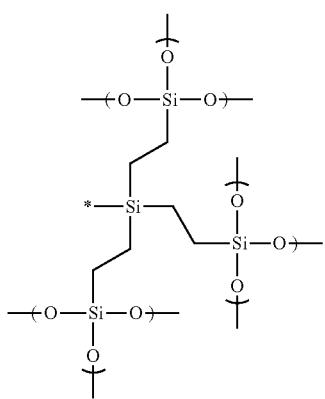

(x-2-1)

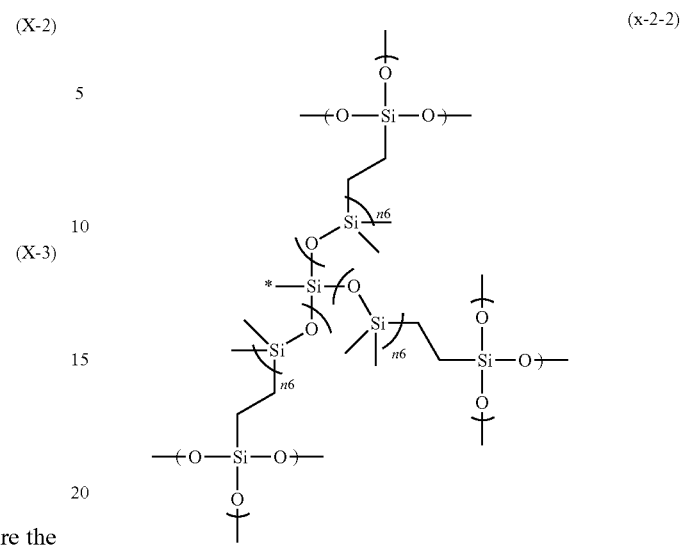

(x-2-2)

(x-2-3)

[Chemical Formula 33]

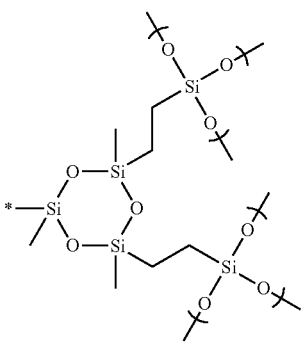

(x-3-1)

(x-3-2)
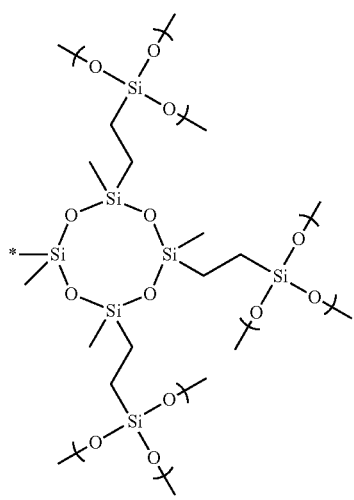
(x-3-3)
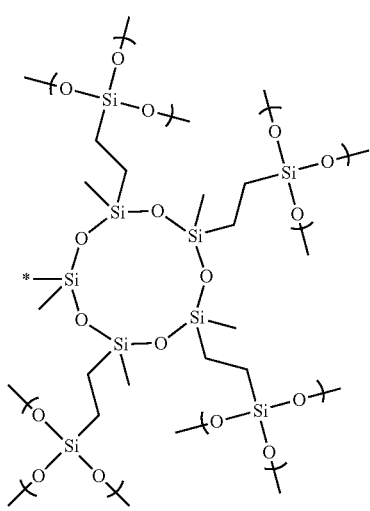
(x-3-4)
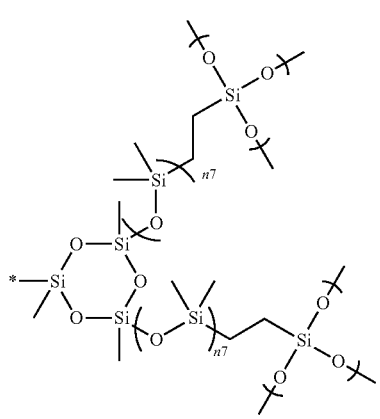
(x-3-5)
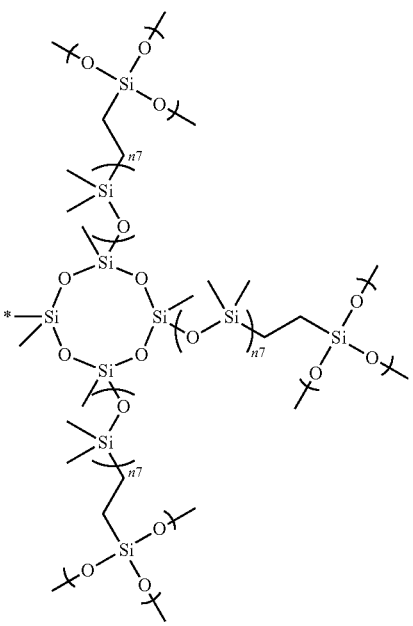
(x-3-6)
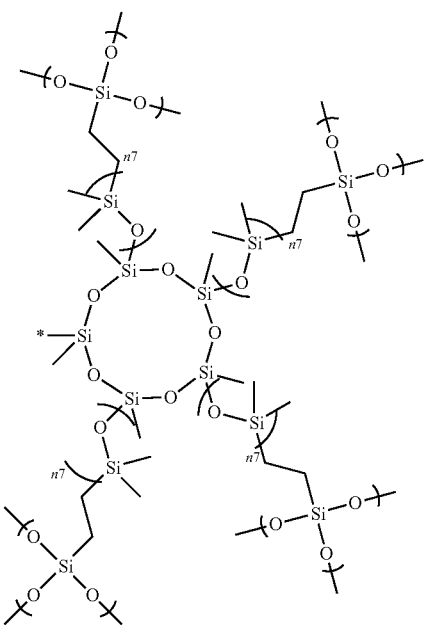
The structure (A) includes, for example, a structure represented by the following formula.
[Chemical Formula 34]
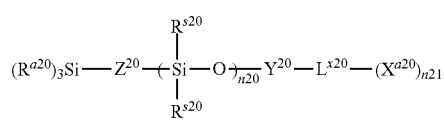
(IA-I)

TABLE 2

| Structure name | $R^{a20}$ | $Z^{20}$ | $R^{s20}$ | $Y^{20}$ | $X^{20}$ |
|---|---|---|---|---|---|
| Ia-I-1 | Me | *—O—* | Me | — | (X-1-1) |
| Ia-I-2 | Me | *—O—* | Me | (Y1) | (X-1-1) |
| Ia-I-3 | Me | *—O—* | Me | (Y2) | (X-1-1) |
| Ia-I-4 | Me | *—O—* | Me | (Y3) | (X-1-1) |
| Ia-I-5 | Me | *—O—* | Me | (Y4) | (X-1-1) |
| Ia-I-6 | TMS | *—O—* | Me | — | (X-1-1) |
| Ia-I-7 | TMS | *—O—* | Me | (Y1) | (X-1-1) |
| Ia-I-8 | TMS | *—O—* | Me | (Y2) | (X-1-1) |
| Ia-I-9 | TMS | *—O—* | Me | (Y3) | (X-1-1) |
| Ia-I-10 | TMS | *—O—* | Me | (Y4) | (X-1-1) |
| Ia-I-11 | Me | *—O—* | Me | — | (X-1-2) |
| Ia-I-12 | Me | *—O—* | Me | (Y2) | (X-1-2) |
| Ia-I-13 | TMS | *—O—* | Me | — | (X-1-2) |
| Ia-I-14 | TMS | *—O—* | Me | (Y2) | (X-1-2) |
| Ia-I-15 | Me | *—O—* | Me | — | (X-2-1) |
| Ia-I-16 | Me | *—O—* | Me | (Y1) | (X-2-1) |
| Ia-I-17 | Me | *—O—* | Me | (Y2) | (X-2-1) |
| Ia-I-18 | Me | *—O—* | Me | (Y3) | (X-2-1) |
| Ia-I-19 | Me | *—O—* | Me | (Y4) | (X-2-1) |
| Ia-I-20 | TMS | *—O—* | Me | — | (X-2-1) |
| Ia-I-21 | TMS | *—O—* | Me | (Y1) | (X-2-1) |
| Ia-I-22 | TMS | *—O—* | Me | (Y2) | (X-2-1) |
| Ia-I-23 | TMS | *—O—* | Me | (Y3) | (X-2-1) |
| Ia-I-24 | TMS | *—O—* | Me | (Y4) | (X-2-1) |
| Ia-I-25 | Me | *—O—* | Me | — | (X-2-2) |
| Ia-I-26 | Me | *—O—* | Me | (Y2) | (X-2-2) |
| Ia-I-27 | TMS | *—O—* | Me | — | (X-2-2) |
| Ia-I-28 | TMS | *—O—* | Me | (Y2) | (X-2-2) |
| Ia-I-29 | Me | *—O—* | Me | — | (X-2-3) |
| Ia-I-30 | Me | *—O—* | Me | (Y2) | (X-2-3) |
| Ia-I-31 | TMS | *—O—* | Me | — | (X-2-3) |
| Ia-I-32 | TMS | *—O—* | Me | (Y2) | (X-2-3) |
| Ia-I-33 | Me | *—O—* | Me | — | (X-3-1) |
| Ia-I-34 | Me | *—O—* | Me | (Y2) | (X-3-1) |
| Ia-I-35 | TMS | *—O—* | Me | — | (X-3-1) |
| Ia-I-36 | TMS | *—O—* | Me | (Y2) | (X-3-1) |
| Ia-I-37 | Me | *—O—* | Me | — | (X-3-2) |
| Ia-I-38 | Me | *—O—* | Me | (Y1) | (X-3-2) |
| Ia-I-39 | Me | *—O—* | Me | (Y2) | (X-3-2) |
| Ia-I-40 | Me | *—O—* | Me | (Y3) | (X-3-2) |
| Ia-I-41 | Me | *—O—* | Me | (Y4) | (X-3-2) |
| Ia-I-42 | TMS | *—O—* | Me | — | (X-3-2) |
| Ia-I-43 | TMS | *—O—* | Me | (Y1) | (X-3-2) |
| Ia-I-44 | TMS | *—O—* | Me | (Y2) | (X-3-2) |
| Ia-I-45 | TMS | *—O—* | Me | (Y3) | (X-3-2) |
| Ia-I-46 | TMS | *—O—* | Me | (Y4) | (X-3-2) |
| Ia-I-47 | Me | *—O—* | Me | — | (X-3-3) |
| Ia-I-48 | Me | *—O—* | Me | (Y2) | (X-3-3) |
| Ia-I-49 | TMS | *—O—* | Me | — | (X-3-3) |
| Ia-I-50 | TMS | *—O—* | Me | (Y2) | (X-3-3) |
| Ia-I-51 | Me | *—O—* | Me | — | (X-3-4) |
| Ia-I-52 | Me | *—O—* | Me | (Y2) | (X-3-4) |
| Ia-I-53 | TMS | *—O—* | Me | — | (X-3-4) |
| Ia-I-54 | TMS | *—O—* | Me | (Y2) | (X-3-4) |
| Ia-I-55 | Me | *—O—* | Me | — | (X-3-5) |
| Ia-I-56 | Me | *—O—* | Me | (Y2) | (X-3-5) |
| Ia-I-57 | TMS | *—O—* | Me | — | (X-3-5) |
| Ia-I-58 | TMS | *—O—* | Me | (Y2) | (X-3-5) |
| Ia-I-59 | Me | *—O—* | Me | — | (X-3-6) |
| Ia-I-60 | Me | *—O—* | Me | (Y2) | (X-3-6) |
| Ia-I-61 | TMS | *—O—* | Me | — | (X-3-6) |
| Ia-I-62 | TMS | *—O—* | Me | (Y2) | (X-3-6) |

In the table, Me means a methyl group, TMS means a trimethylsilyloxy group, and (Y1) to (Y4) each independently represents groups represented by the following formulas.

[Chemical Formula 35]

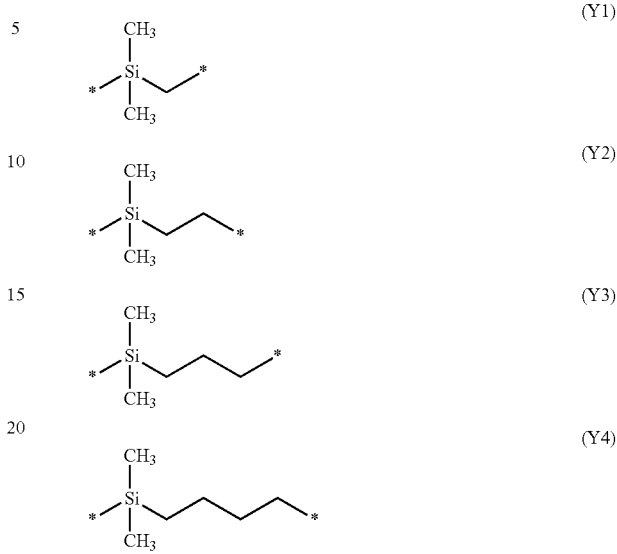

In the coating film as a cured product of the composition of the present invention, the second hydrocarbon chain-containing group, a hydroxy group, an alkoxy group, or a group formed by condensation of a hydroxy group may be bonded to a silicon atom (second silicon atom) which is derived from the metal compound (b) and is different from the silicon atom to which the trialkylsilyl group-containing molecular chain is bonded. The second silicon atom may be substituted with the other metal atom (e.g., Al, Fe, In, Ge, Hf, Si, Ti, Sn, or Zr). The second silicon atoms or other metal atoms also act as a spacer, thus enabling enhancement in water repellency improving effect due to the trialkylsilyl group-containing molecular chain since the hydrocarbon chain-containing group having the carbon number smaller than that of the trialkylsilyl group-containing molecular chain, a hydroxy group, an alkoxy group, or a hydroxy group is bonded thereto.

The structure (B) derived from the metal compound (b) is preferably represented by the following formula:

[Chemical Formula 36]

wherein, in formula (IB-1), $R^{b1}$, M, and m1 are the same as defined above, $X^{b7}$ represents a hydrocarbon chain-containing group, a siloxane backbone-containing group, a hydroxy group, or an —O— group, $R^{b1}$ and $X^{b7}$ may be the same or different when $X^{b7}$ and $R^{b1}$ are siloxane backbone-containing groups or hydrocarbon chain-containing groups, and $R^{b1}$ and $X^{b7}$ may be the same or different between plural formulas (IB-1); and

[Chemical Formula 37]

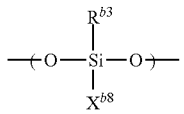
(IB-2)

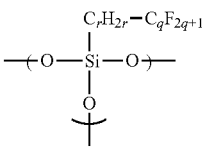
(IB-I-7)

wherein, in formula (IB-2), $R^{b3}$ is the same as defined above, $X^{b8}$ represents a hydrolyzable silane oligomer residue, and $X^{b8}$ represents a hydrolyzable group, a fluorine-containing alkyl group having 1 to 4 carbon atoms, an alkyl group having 1 to 4 carbon atoms, or an —O— group.

Both the hydrocarbon chain-containing group and the siloxane backbone-containing group in formula (IB-1) can be selected from the range described above.

The hydrolyzable silane oligomer residue, the hydrolyzable group, the fluorine-containing alkyl group, and the alkyl group can be selected from the range shown as examples of $X^{b3}$ in formula (IB-2).

When M is Si, the structure (B) preferably includes, for example, structures represented by the following formulas (IB-I-1) to (IB-I-7). In the formulas, r represents an integer of 1 to 10 (particularly an integer of 1 to 3) and q represents an integer of 1 to 20 (particularly an integer of 6 to 10)

[Chemical Formula 38]

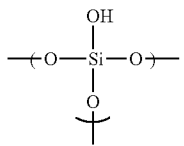
(IB-I-1)

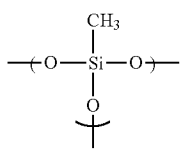
(IB-I-2)

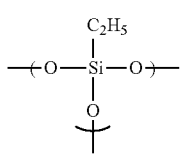
(IB-I-3)

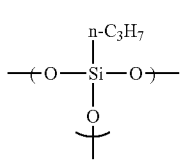
(IB-I-4)

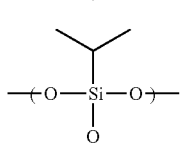
(IB-I-5)

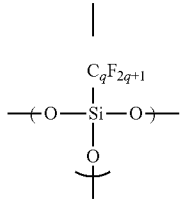
(IB-I-6)

In the coating film including these structures (A) and (B) of the present invention, the contact angle change rate (($B_{Z1}-A_1$)/$A_1$×100(%)) preferably satisfies a relationship represented by the following formula:

$$(B_{Z1}-A_1)/A_1\times 100(\%) \geq -9(\%)$$

where $A_1$ is an initial contact angle of the liquid droplet on the coating film, and $B_{Z1}$ is a contact angle of the liquid droplet on the coating film after irradiation with light from a mercury lamp having an emission line in a wavelength region of 300 nm or less at the intensity on an irradiated surface of 200±10 mW/cm² for 4 hours in an air atmosphere at a temperature of 20 to 40° C. and a humidity of 30 to 75%.

The coating film of the present invention has particularly satisfactory light resistance and the water repellency is less likely to deteriorate even when irradiated with high-intensity light. The contact angle change ratio (($B_{Z1}-A_1$)/$A_1$×100(%)) before and after irradiation for 4 hours is more preferably −10% or more, still more preferably −7% or more, and particularly preferably −5% or more, and the contact angle change ratio is usually 0% or less and may be, for example, −0.5% or less.

In the coating film of the present invention, the contact angle change rate (($B_{Z2}-A_1$)/$A_1$×100(%)) preferably satisfies a relationship represented by the following formula:

$$(B_{Z2}-A_1)/A_1\times 100(\%) \geq -34(\%)$$

where $B_{Z2}$ is a contact angle of the liquid droplet on the coating film after irradiation with light from a mercury lamp having an emission line in a wavelength region of 300 nm or less at the intensity on an irradiated surface of 200±10 mW/cm² for 6 hours in an air atmosphere at a temperature of 20 to 40° C. and a humidity of 30 to 75%.

The contact angle change ratio before and after irradiation for 6 hours is more preferably −20% or more, still more preferably −15% or more, and particularly preferably −10% or more, and the contact angle change ratio is usually 0% or less and may be, for example, −0.5% or less.

Irradiation with light from the mercury lamp is preferably performed in an air atmosphere, the temperature is preferably 20° C. or higher and 40° C. or lower, and the humidity is preferably 40% or higher and 75% or lower.

Examples of the mercury lamp used for irradiation include "SP-9 250DB" manufactured by USHIO INC.

In the coating film of the present invention, the contact angle change rate (($B_H-A_1$)/$A_1$×100(%)) preferably satisfies a relationship represented by the following formula:

$$(B_H-A_1)/A_1\times 100(\%) \geq -20(\%)$$

where $B_H$ is a contact angle of the liquid droplet on the coating film after heating at 200° C. for 100 hours.

The contact angle change ratio before and after heating at 200° C. for 100 hours is more preferably −10% or more, and still more preferably −7% or more, and the contact angle change ratio is 0% or less and may be, for example, −0.5% or less.

When the coating film is cured, the composition is left to stand in the air in a state of being in contact with the substrate, whereby, moisture in the air is captured, thus hydrolyzing the hydrolyzable group to form a siloxane backbone. The composition may be maintained at 40 to 250° C. when it is left to stand.

The thus obtained coating film of the present invention is excellent in weather resistance as compared to a conventional coating film obtained from a fluorine coating agent.

The coating film obtained from the composition of the present invention includes a trialkylsilyl group-containing molecular chain or a molecular chain in which alkyl groups in the trialkylsilyl-containing molecular chain are substituted with fluoroalkyl groups, and a change in contact angle before and after thermal history or before and after photoirradiation is controlled to a given range. Therefore, the coating film has high chemical/physical durability.

The coating film obtained from the composition of the present invention is usually formed on a substrate, and a substrate subjected to a coating treatment including a coating film formed on the substrate is also included in the scope of the present invention. The substrate may be in the form of a flat surface or a curved surface or may have a three-dimensional structure in which a large number of surfaces are combined. The substrate may be composed of either an organic material or an inorganic material. Examples of the organic material include thermoplastic resins such as an acrylic resin, a polycarbonate resin, a polyester resin, a styrene resin, an acrylic-styrene copolymer resin, a cellulose resin, a polyolefin resin, and a polyvinyl alcohol resin; and thermosetting resins such as a phenol resin, a urea resin, a melamine resin, an epoxy resin, an unsaturated polyester, a silicone resin, and a urethane resin. Examples of the inorganic material include ceramics; glass; metals such as iron, silicon, copper, zinc, and aluminum; and alloys including the above metals.

The substrate may be subjected to a hydrophilization treatment. Examples of hydrophilization treatment include a corona treatment, a plasma treatment, and an ultraviolet treatment. The substrate may also be subjected to a primer treatment with a resin, a silane coupling agent, a tetraalkoxysilane or the like.

By forming a primer layer between a water-repellent film and a substrate, durability such as moisture resistance and alkali resistance can be further improved. The primer layer is preferably a layer formed from an under-layer forming composition (primer layer forming composition) containing a component (P) capable of forming a siloxane backbone. The primer layer is preferably a layer formed of an under-layer forming composition containing a component (P1) composed of a compound represented by the following formula (III) and/or a partially hydrolyzed condensate thereof:

wherein, in formula (III), $X^{p2}$ each independently represents a halogen atom, an alkoxy group, or an isocyanate group.

In the formula (III), $X^{p2}$ is preferably a chlorine atom, an alkoxy group having 1 to 4 carbon atoms, or an isocyanate group, and it is more preferred that four $X^2$(s) are the same.

Specifically, $Si(NCO)_4$, $Si(OCH_3)_4$, $Si(OC_2H_5)_4$ and the like are preferably used as the compound represented by the general formula (III). In the present invention, the compounds (III) may be used alone, or two or more compounds may be used in combination.

The component (P1) contained in the under-layer forming composition (primer layer forming composition) may be a partially hydrolyzed condensate of the compound (III). The partially hydrolyzed condensate of the compound (III) can be obtained by applying a general hydrolytic condensation method using an acid or base catalyst. The degree of condensation (degree of polymerization) of the partially hydrolyzed condensate is required to be the degree which allows the product to be dissolved in a solvent. The component (P1) may be either the compound (III) or a partially hydrolyzed condensate of the compound (III) or may be a mixture of the compound (III) and a partial hydrolysis condensation thereof, for example, a partially hydrolyzed condensate of the compound (III) containing the unreacted compound (III). The compound represented by the general formula (III) or the partially hydrolyzed condensate thereof includes a commercial available product and such commercial available product can be used in the present invention.

The under-layer forming composition (primer layer forming composition) may be a composition containing the component (P1), and a component (P2) composed of a compound represented by the following formula (IV) and/or a partially hydrolyzed condensate thereof, or a composition containing a partially hydrolyzed co-condensate of the component (P1) and the component (P2) (which may contain the component (P1) and/or the compound (IV)):

wherein, in formula (IV), $X^{p3}$ each independently represents a hydrolyzable group or a hydroxyl group and p is an integer of 1 to 8.

The compound (IV) is a compound having a hydrolyzable silyl group or a silanol group at both ends of a divalent organic group (preferably an aliphatic hydrocarbon group, and particularly an alkylene group) therebetween.

Examples of the hydrolyzable group represented by $X^{p3}$ in the formula (IV) include the same groups or atoms for $X^{p2}$. $X^{p3}$ is preferably an alkoxy group and an isocyanate group, and particularly preferably an alkoxy group, from the viewpoint of balance between stability of the compound (IV) and ease of hydrolysis. The alkoxy group is preferably an alkoxy group having 1 to 4 carbon atoms, and more preferably a methoxy group or an ethoxy group. These groups are appropriately selected according to the purposes, applications and the like in production. Plural $X^{p3}$ (s existing in the compound (IV) may be the same or different and are preferably the same from the viewpoint of ease of availability.

Specific examples of the compound (IV) include $(CH_3O)_3SiCH_2CH_2Si(OCH_3)_3$, $(OCN)_3SiCH_2CH_2Si(NCO)_3$, $Cl_3SiCH_2CH_2SiCl_3$, $(C_2H_5O)_3SiCH_2CH_2Si(OC_2H_5)_3$, $(CH_3O)_3SiCH_2CH_2CH_2CH_2CH_2CH_2Si(OCH_3)_3$ and the like. In the present invention, the compound (IV) may be used alone, or two or more compounds thereof may be used in combination.

The component contained in the under-layer forming composition (primer layer forming composition) may be a partially hydrolyzed condensate of the compound (IV). The partially hydrolyzed condensate of the compound (IV) can be obtained by the same method as described in the production of the partially hydrolyzed condensate of the compound (III). The degree of condensation (degree of polymerization) of the partially hydrolyzed condensate is required to be the degree which allows the product to be dissolved in a solvent. The component (P) may be the compound (IV), or the partially hydrolyzed condensate of the compound (III) or may be a mixture of the compound (IV) and a partial hydrolysis condensation thereof, for example, a partially hydrolyzed condensate of the compound (IV) containing the unreacted compound (IV).

As the compound represented by the general formula (IV) or a partially hydrolyzed condensate thereof, a commercially product is available, and such a commercial product can be used in the present invention.

Various polysilazanes capable of obtaining an oxide film containing silicon as a main component like the compound (III) may be used for the under-layer.

The under-layer forming composition (primer layer forming composition) usually contains, in addition to a solid component as a layer forming component, an organic solvent in consideration of economic efficiency, workability, and ease of controlling the thickness of the thus obtained primer layer. The organic solvent is not particularly limited as long as it is capable of dissolving a solid component contained in the under-layer forming composition (primer layer forming composition). Examples of the organic solvent include the same compounds as in the water-repellent film forming composition. The organic solvent is not limited to one solvent, and two or more solvents different in polarity, vaporization rate and the like may be mixed and used.

When the under-layer forming composition (primer layer forming composition) contains a partially hydrolyzed condensate or a partially hydrolyzed co-condensate, the under-layer forming composition may contain a solvent used for producing these condensates.

Further, in the under-layer forming composition (primer layer forming composition), a catalyst such as an acid catalyst which is the same as that generally used in a partial hydrolytic condensation reaction is preferably blended even if it does not contain a partially hydrolyzed condensate and a partially hydrolyzed co-condensate, in order to accelerate a hydrolytic co-condensation reaction. Even if the under-layer forming composition contains a partially hydrolyzed condensate and a partially hydrolyzed co-condensate, a catalyst is preferably blended when a catalyst used in these condensates does not remain in the composition.

The under-layer forming composition (primer layer forming composition) may contain water for performing a hydrolytic condensation reaction and a hydrolytic co-condensation reaction of the contained component.

It is possible to use, as a method for forming an under-layer using the under-layer forming composition (primer layer forming composition), a known method using an organosilane compound-based surface treatment agent. For example, an under-layer forming composition (primer layer forming composition) is applied onto a surface of a base by a method such as a brush coating, flow coating, rotation coating, immersion coating, squeeze coating, spray coating, or hand coating method, dried as necessary in the air or a nitrogen atmosphere, and then cured, thus enabling formation of an under-layer. Conditions for curing are appropriately controlled according to the type, concentration and the like of the composition to be used.

Curing of the under-layer forming composition (primer layer forming composition) may be performed simultaneously with curing of a water-repellent film forming composition.

The thickness of the primer layer is not particularly limited as long as moisture resistance, adhesion, and barrier property to an alkali from the base can be imparted to a water-repellent film formed on the primer layer.

The film obtained from the composition of the present invention can simultaneously attain water repellency as well as heat resistance and light resistance (weatherability) and is free from clouding and coating unevenness after film formation and does not require a wiping-up step. Therefore, it is useful as a base material in display devices such as touch panel displays, optical elements, semiconductor elements, building materials, automobile parts, nanoimprint technique and the like. Further, it is suitably used as articles such as bodies, window glasses (windshield, side glass, rear glass), mirrors, and bumpers in transportation apparatuses such as trains, automobiles, ships, and aircrafts. It can also be used for outdoor applications such as building exterior walls, tents, photovoltaic power generation modules, sound insulation boards, and concrete. It can also be used for fishing nets, insect repository, aquarium and the like. Furthermore, it can be used for various indoor facilities such as kitchen, bathroom, washbasin, mirror, articles of various members around the toilet, china ceramics such as chandeliers and tiles, artificial marble, air conditioner and the like. It can also be used as an antifouling treatment for jigs, inner walls, piping and the like in factories. Goggles, eyeglasses, helmets, slot machine (Pachinko, fibers, umbrella, play equipment, soccer balls and the like. Furthermore, it can be used as an anti-adhesion agent for various packaging materials, such as food packaging material, cosmetic wrapping material, and pot interior.

EXAMPLES

The present invention will be more specifically described by way of Examples. It is to be understood that the present invention is not limited to the following Examples, and various design variations made in accordance with the purports mentioned hereinbefore and hereinafter are also included in the technical scope of the present disclosure. In the following, parts are by weight and percentages are by weight unless otherwise specified.

[Measurement of Contact Angle]

The contact angle of a coating film surface to water was measured by a θ/2 method with a liquid amount set at 3 µL using "DM 700" manufactured by Kyowa Interface Science Co., LTD.

[Light Resistance Test]

A uniform light irradiation unit (manufactured by USHIO INC.) was attached to a mercury lamp (SP-9 250DB, manufactured by USHIO INC.) and a sample was arranged on the position separated by a distance of 17.5 cm from a lens. A light intensity of 200 to 800 nm was measured using an intensimeter (VEGA, manufactured by OPHIL) and found to be 200 mW/cm$^2$. The sample was irradiated with light from a mercury lamp for 4 hours or 6 hours in an air atmosphere at a temperature of 20 to 40° C. and humidity of 30 to 75%. A contact angle change rate before and after irradiation was calculated based on the following formula:

$$\text{Contact angle change rate (\%)} = \{(B_Z - A_1)/A_1\} \times 100\ (\%)$$

where $A_1$ is an initial contact angle on a transparent coating film and $B_Z$ is a contact angle of the liquid droplet after irradiation.

A spectral irradiance of the mercury lamp ("SP-9 250DB", manufactured by USHIO INC.) is as shown in FIG. 1 and had a bright line in the wavelength region of 300 nm or less.

[Heat Resistance Test]

The thus obtained transparent coating film was left to stand at a temperature of 200° C. for 100 hours, thereby performing a heat resistance test.

[Appearance Test]

It was visually evaluated whether or not a foreign substance and clouding exist on a surface of the thus obtained coating film.

Good: Neither foreign substance nor clouding exists
Bad: Foreign substance or clouding exists Synthesis Example 1

A three-neck flask equipped with a condenser was charged with 3.94 g of trichloroisocyanuric acid and then purged with nitrogen. Dichloromethane (50 mL) was charged into the flask through a septum, followed by stirring and the addition of 5.0 g of tris(trimethylsiloxy)silane. After stirring for 1 hour, the mixture was filtered. The filtrate was added dropwise while being cooled in an ice bath charged with 150 mL of diethyl ether, 50 mL of ion-exchanged water, and 1.87 g of triethylamine. The mixture was stirred at room temperature for 1 hour. The mixture was washed with ion-exchanged water, dehydrated over magnesium sulfate, and concentrated at 25° C. under 150 mmHg to obtain 5.8 g of the objective silanol compound (1) represented by the following formula.

[Chemical Formula 39]

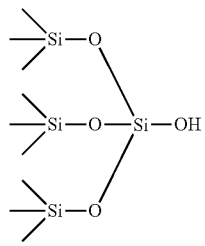

The three-neck flask were charged with 1.56 g of the silanol compound (1) and 7.00 g of THF, followed by stirring. After cooling to −40° C., 3.13 mL of an n-BuLi-hexane solution (1.6 mol/L) was added dropwise. The temperature was raised to 0° C. and 8.90 g of hexamethylcyclotrisiloxane dissolved in 7.00 g of THF was added dropwise, followed by stirring for 17 hours. After cooling to −40° C., 0.60 g of chlorodimethylvinylsilane was added dropwise. After the addition of 50 mL of hexane and filtration, separate washing with eater was performed until waste water became neutral, followed by dehydration over magnesium sulfate. The solution thus obtained was concentrated under 130 hPa at 25° C. to obtain an intermediate (1) represented by the following formula.

[Chemical Formula 40]

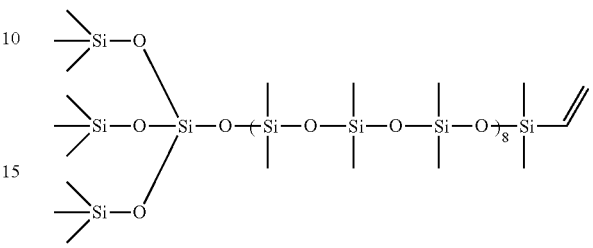

A four-necked flask was charged with 5.77 g of 1,3,5,7-tetramethylcyclotetrasiloxane, followed by ice cooling. A mixture prepared by mixing the intermediate (1) with 5 µL of a platinum(0)-1,3-divinyl-1,1,3,3-tetramethyldisiloxane complex solution was added dropwise. After stirring for 15 minutes, the mixed solution was concentrated under 2 hPa at 30° C. After cooling at −40° C., a mixture prepared by mixing 9.24 g of vinyltrimethoxysilane with 142 µL of a platinum(0)-1,3-divinyl-1,1,3,3-tetramethyldisiloxane complex solution was added dropwise and the temperature was returned to room temperature, followed by stirring for 2 hours. The solution was concentrated under 2 hPa at 40° C. to obtain a compound (1) represented by the following formula.

The measurement results of $^1$H-NMR (400 MHz, standard: CHCl$_3$ (=7.24 ppm)) of the thus obtained compound (1) are shown below.

$^1$H-NMR (solvent: CDCl$_3$) δ (ppm): 0.07-0.1((CH$_3$)$_3$—Si), 0.03-0.06((CH$_3$)$_2$—Si), 3.3-4.0(Si—O—CH$_3$)

[Chemical Formula 41]

Compound (1)

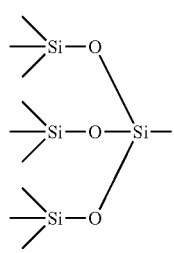 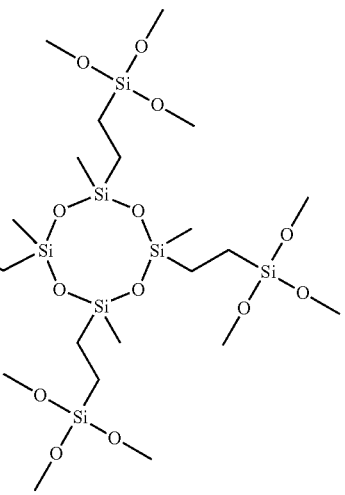

Synthesis Example 2

In the same manner as in Synthesis Example 1, an intermediate (1) was obtained.

A four-necked flask was charged with 7.89 g of tetrakis(dimethylsilyloxy)silane, followed by ice cooling. A mixture prepared by mixing the intermediate (1) with 5 μL of a platinum(0)-1,3-divinyl-1,1,3,3-tetramethyldisiloxane complex solution was added dropwise. After stirring for 15 minute, the mixed solution was concentrated under 2 hPa at 30° C. After cooling at −40° C., a mixture prepared by mixing 9.24 g of vinyltrimethoxysilane with 142 μL of a platinum(0)-1,3-divinyl-1,1,3,3-tetramethyldisiloxane complex solution was added dropwise, and the temperature was returned to room temperature, followed by stirring for 2 hours. The solution was concentrated under 2 hPa at 40° C. to obtain a compound (2) represented by the following formula.

The measurement results of $^1$H-NMR (400 MHz, standard: CDCl$_3$ (=7.24 ppm)) of the thus obtained compound (2) are shown below.

$^1$H-NMR (solvent: CDCl$_3$) δ (ppm): 0.07-0.1((CH$_3$)$_3$—Si), 0.03-0.06((CH$_3$)$_2$—Si), 3.3-4.0(Si—O—CH$_3$)

[Chemical Formula 42]

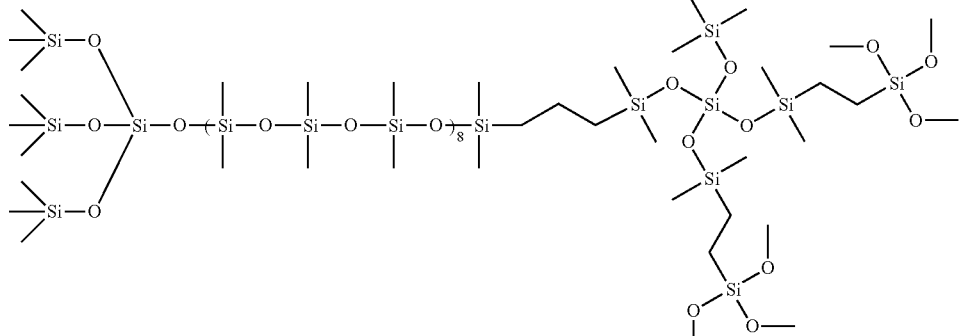
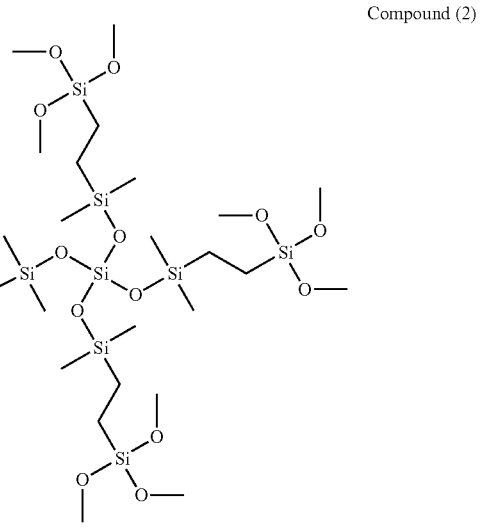

Compound (2)

Synthesis Example 3

In the same manner as in Synthesis Example 1, except that the amount of hexamethylcyclotrisiloxane was changed to 3.34 g, an intermediate (2) was obtained. The intermediate (2) thus obtained was subjected to a treatment in the same manner as in Synthesis Example 2 to obtain a compound (3).

The measurement results of $^1$H-NMR (400 MHz, standard: CDCl$_3$(=7.24 ppm)) of the thus obtained compound (3) are shown below.

$^1$H-NMR (solvent: CDCl$_3$) δ (ppm): 0.07-0.1((CH$_3$)$_3$—Si), 0.03-0.06((CH$_3$)$_2$—Si), 3.3-4.0(Si—O—CH$_3$)

[Chemical Formula 43]

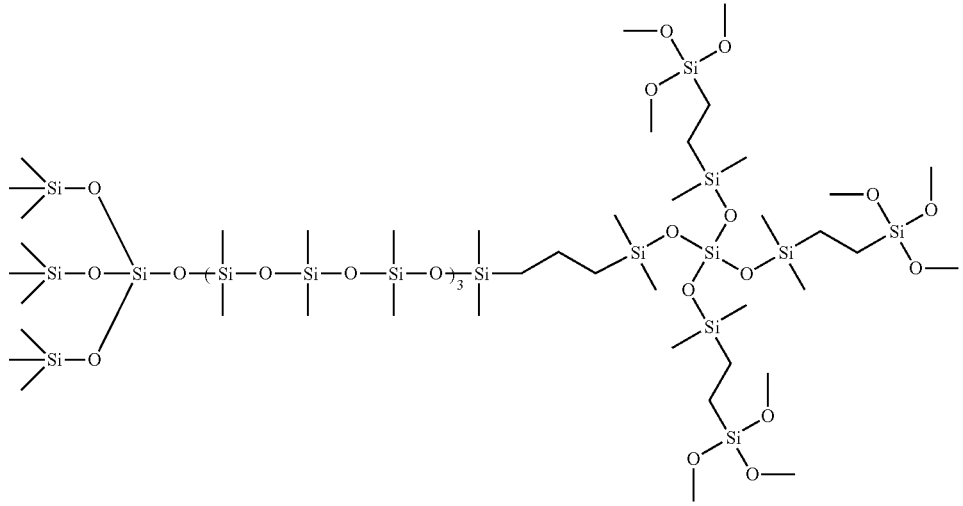

Compound (3)

Synthesis Example 4

In the same manner as in Synthesis Example 1, except that 0.66 g of trimethylsilanol was used in place of using 1.56 g of the silanol compound (1), an intermediate (3) was obtained. The intermediate (3) thus obtained was subjected to a treatment in the same manner as in Synthesis Example 1 to obtain a compound (4).

The measurement results of $^1$H-NMR (400 MHz, standard: $CDCl_3$ (=7.24 ppm)) of the thus obtained compound (4) are shown below.

$^1$H-NMR (solvent: $CDCl_3$) δ (ppm): 0.07-0.1(($CH_3$)$_3$—Si), 0.03-0.06(($CH_3$)$_2$—Si), 3.3-4.0(Si—O—$CH_3$)

[Chemical Formula 44]

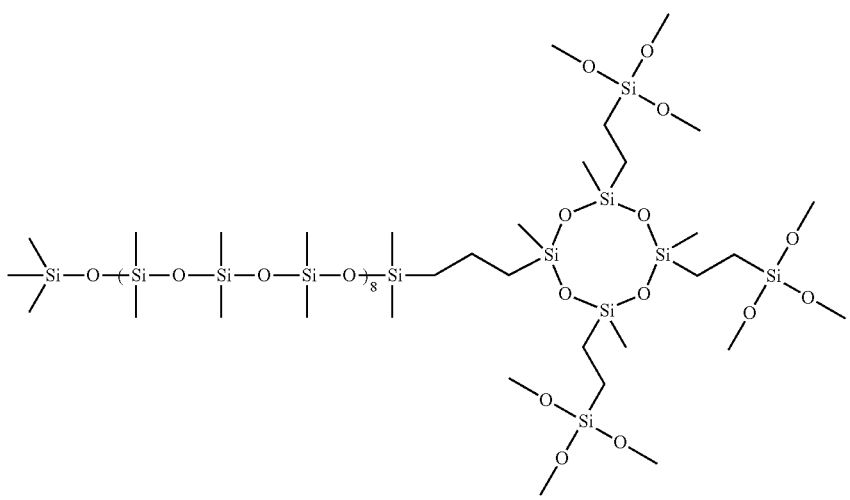

Compound (4)

Example 1

To 5.0 mL of methyl ethyl ketone, $6.4 \times 10^{-5}$ mol of the compound (1), $1.0 \times 10^{-3}$ mol of tetraethoxysilane (TEOS), and 2.8 mL of an aqueous 0.01M hydrochloric acid solution were added, followed by stirring for 24 hours to prepare a sample solution.

The sample solution was diluted with methyl ethyl ketone by 20 times to obtain a coating solution (1).

Example 2

To 5.4 mL of methyl ethyl ketone, $6.3 \times 10^{-5}$ mol of the compound (2), $1.0 \times 10^{-3}$ mol of TEOS, and 1.4 mL of an aqueous 0.01M hydrochloric acid solution were added, followed by stirring for 24 hours to prepare a sample solution.

The sample solution was diluted with methyl ethyl ketone by 20 times to obtain a coating solution (2).

Example 3

To 8.5 mL of methyl ethyl ketone, $9.7 \times 10^{-5}$ mol of the compound (3), $2.0 \times 10^{-3}$ mol of TEOS, and 4.0 mL of an aqueous 0.01M hydrochloric acid solution were added, followed by stirring for 24 hours to prepare a sample solution.

The sample solution was diluted with methyl ethyl ketone by 20 times to obtain a coating solution (3).

Example 4

To 7.2 mL of methyl ethyl ketone, $6.3 \times 10^{-5}$ mol of the compound (4), $1.0 \times 10^{-3}$ mol of TEOS, and 2.4 mL of an aqueous 0.01M hydrochloric acid solution were added, followed by stirring for 24 hours to prepare a sample solution.

The sample solution was diluted with methyl ethyl ketone by 20 times to obtain a coating solution (4).

Example 5

To 5.9 mL of methyl ethyl ketone, $8.6 \times 10^{-5}$ mol of the compound (1), $1.0 \times 10^{-3}$ mol of TEOS, and 1.9 mL of an aqueous 0.01M hydrochloric acid solution were added, followed by stirring for 24 hours to prepare a sample solution.

The sample solution was diluted with methyl ethyl ketone by 20 times to obtain a coating solution (5).

Example 6

To 5.4 mL of methyl ethyl ketone, $6.3 \times 10^{-5}$ mol of the compound (2), $6.3 \times 10^{-4}$ mol of TEOS, and 1.4 mL of an aqueous 0.01M hydrochloric acid solution were added, followed by stirring for 24 hours to prepare a sample solution.

The sample solution was diluted with methyl ethyl ketone by 20 times to obtain a coating solution (6).

Example 7

To 8.7 mL of methyl ethyl ketone, $6.3 \times 10^{-5}$ mol of the compound (2), $1.9 \times 10^{-3}$ mol of TEOS, and 3.7 mL of an aqueous 0.01M hydrochloric acid solution were added, followed by stirring for 24 hours to prepare a sample solution.

The sample solution was diluted with methyl ethyl ketone by 20 times to obtain a coating solution (7).

Example 8

To 6.1 mL of methyl ethyl ketone, $9.7 \times 10^{-5}$ mol of the compound (3), $9.6 \times 10^{-4}$ mol of TEOS, and 2.2 mL of an aqueous 0.01M hydrochloric acid solution were added, followed by stirring for 24 hours to prepare a sample solution.

The sample solution was diluted with methyl ethyl ketone by 20 times to obtain a coating solution (8).

Each of the coating solutions (1) to (8) was applied onto an alkali-washed glass substrate (EAGLE XG, manufactured by Corning) at 3,000 rpm for 20 s using a spin coater (manufactured by MIKASA CO., LTD.) and then cured at a predetermined temperature. With respect to all samples, the wiping-up step was not performed.

With respect to each of samples thus obtained, an initial contact angle was measured, and light resistance was evaluated.

Comparative Example 1

OPTOOL DSX-E (manufactured by DAIKIN INDUSTRIES, LTD.) (0.2 g) and 39.8 g of Novec7200 (manufactured by 3M Company) were stirred at room temperature to obtain a comparative coating solution (1). In the same manner as in Examples, a film was formed and then evaluated.

Comparative Example 2

To a mixture prepared by stirring 0.5 g of the compound (4), 0.57 g of butyl acetate, and 3.24 g of octane for 5 minutes, 0.22 g of an aqueous 10% nitric acid solution was added, followed by stirring for 3 hours to obtain a comparative coating solution (2). In the same manner as in Examples, a film was formed and then evaluated.

With respect to the coating films obtained in Examples 1 to 8 and Comparative Examples 1 to 2, a light resistance test was performed. The results are shown in Table 5.

transparent film free from a foreign substance and clouding was obtained. Sample of Comparative Example 2 was rated "Bad" since the foreign substance existed in the plane and the clouded portion due to thickness unevenness partially existed. With respect to the sample of Comparative Example 2, sample after the light resistance test and the heat resistance test exhibited small average decrease in contact angle as compared to Comparative Example 1. However, variation in contact angle increases in the vicinity of the foreign substance existing on a surface and unevenness.

INDUSTRIAL APPLICABILITY

The coating film obtained from the composition of the present invention can simultaneously attain water repellency as well as heat resistance and light resistance (weatherability) and is free from clouding and coating unevenness after film formation and requires no wiping-up step. Therefore, the film is useful as a substrate in display devices such as touch panel displays, optical elements, semiconductor elements, building materials, automobile parts, nanoimprint techniques and the like. The film is also suitably used as articles such as bodies, window glasses (windshield, side glass, rear glass), mirrors, and bumpers in transportation apparatuses such as trains, automobiles, ships, and aircrafts. The film can also be used for outdoor applications such as building outer walls, tents, solar photovoltaic power generation modules, sound insulation boards, concrete and the like. The film can also be used for fishing nets, insect-catching nets, aquariums and the like. The film can also be used for various indoor facilities such as kitchen, bathroom,

TABLE 3

|  |  |  | Example | | | | | | | | Comparative Example | |
|---|---|---|---|---|---|---|---|---|---|---|---|---|
|  |  |  | 1 | 2 | 3 | 4 | 5 | 6 | 7 | 8 | 1 | 2 |
| Initial | Contact angle | ° | 100.0 | 102.0 | 99.3 | 101.2 | 99.3 | 99.7 | 99.6 | 98.4 | 111.8 | 104.8 |
| 4 hours | Contact angle | ° | 95.4 | 95.2 | 96.0 | 97.4 | 96.8 | 97.8 | 97.4 | 97.6 | 94.3 | 99.4 |
|  | Change rate | % | −4.6 | −6.7 | −2.5 | −3.8 | −2.5 | −1.9 | −0.8 | −0.8 | −15.7 | −5.2 |
| 6 hours | Contact angle | ° | 92.0 | 92.8 | 95.4 | 96.7 | 96.5 | 96.8 | 96.4 | 96.4 | 73.2 | 105.0 |
|  | Change rate | % | −8.0 | −9.0 | −3.1 | −4.4 | −2.8 | −2.9 | −3.1 | −2.0 | −34.5 | 0.2 |

The results of the heat resistance test of the coating films obtained in Examples 1 to 8 and Comparative Examples 1 to 2 are shown in Table 6.

washbasin, mirrors, articles of various members around the toilet, china ceramics such as chandeliers and tiles, artificial marbles, air conditioners and the like. The film can also be

TABLE 4

|  |  |  | Example | | | | | | | | Comparative Example | |
|---|---|---|---|---|---|---|---|---|---|---|---|---|
|  |  |  | 1 | 2 | 3 | 4 | 5 | 6 | 7 | 8 | 1 | 2 |
| Initial | Contact angle | ° | 100.0 | 102.0 | 99.3 | 101.2 | 99.3 | 99.7 | 99.6 | 98.4 | 111.8 | 104.8 |
| 100 hours | Contact angle | ° | 96.1 | 98.1 | 90.4 | 95.4 | 93.7 | 96.4 | 94.1 | 93.3 | 94.3 | 104.4 |
|  | Change rate | % | −5.8 | −3.8 | −5.2 | −5.7 | −5.6 | −3.3 | −5.5 | −5.2 | −15.7 | −0.4 |

As a result of visual evaluation, samples of Examples 1 to 8 and Comparative Example 1 were rated "Good" since a used for an antifouling treatment for jigs, inner walls, pipings and the like in factories. The film is suitable for goggles, eyeglasses, helmets, Japanese pinboles, fibers, umbrellas, play equipment, soccer balls and the like. The film can also be used as an antifouling agent for various packaging materials, such as food packaging materials, cosmetic wrapping materials, pot interiors and the like.

The invention claimed is:

1. A composition comprising an organosilicon compound (a) which has at least one trialkylsilyl group and has a hydrolyzable silicon-containing group, wherein the hydrolyzable silicon-containing group is represented by any one of formulas (X-1) to (X-3):

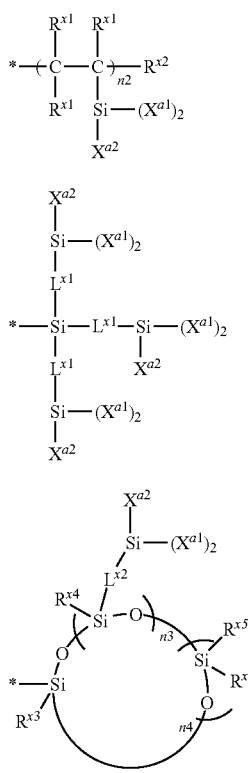

wherein, in formulas (X-1) to (X-3), $L^{x1}$ to $L^{x2}$ each independently represents a divalent hydrocarbon group having 1 to 20 carbon atoms, and a methylene group ($-CH_2-$) included in the divalent hydrocarbon group may be substituted with $-O-$ or $-O-Si(R^{x7})_2-$, $R^{x1}$ to $R^{x7}$ each independently represents a hydrogen atom or a hydrocarbon group having 1 to 10 carbon atoms, $X^{a1}$ each independently represents a hydrolyzable group or a trialkoxysilyloxy group, $X^{a2}$ each independently represents a trialkylsilyl-containing group, a hydrocarbon chain-containing group, a siloxane backbone-containing group, a hydrolyzable group, or a trialkoxysilyloxy group, and $X^{a2}$ and $X^{a1}$ may be the same or different when $X^{a2}$ is a hydrolyzable group, n2 represents an integer of 1 or more and 50 or less, n3 represents an integer of 2 or more and 5 or less, n4 represents an integer of 0 or more and 5 or less, and in formula (X-3), the order of units represented by $(Si(R^{x4})(-L^{x2}-Si(X^{a2})(X^{a1})_2)-O-)$ and $(Si(R^{x5})(R^{x6})-O-)$ is arbitrary, and a metal compound (b) in which at least one hydrolyzable group is bonded to a metal atom, wherein the organosilicon compound (a) is a compound represented by formula (Ia):

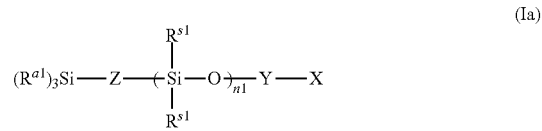

wherein, in formula (Ia),

Y represents a single bond or $*-Si(R^{s2})_2-L^{s1}-$, in which $*$ represents a bond with an oxygen atom, Z represents an oxygen atom or a divalent hydrocarbon group having 1 to 10 carbon atoms, $R^{a1}$ each independently represents a hydrocarbon group or a trialkylsilyloxy group, and the hydrocarbon group represented by $R^{a1}$ is an alkyl group when all $R^{a1}$(s) are hydrocarbon groups, $R^{s1}$ and $R^{s2}$ each independently represents an alkyl group having 1 to 10 carbon atoms, $L^{s1}$ represents a divalent hydrocarbon group having 1 to 10 carbon atoms, X is represented by any one of formulas (X-1) to (X-3), and n1 represents an integer of 1 or more and 150 or less.

2. The composition according to claim 1, wherein a ratio of the metal compound (b) to the organosilicon compound (a) (metal compound (b)/organosilicon compound (a)) is 0.1 or more and 100 or less in terms of mol.

3. The composition according to claim 1, further comprising a solvent (c).

4. A coating film which is a cured product of the composition according to claim 1.

5. A compound represented by the following formula:

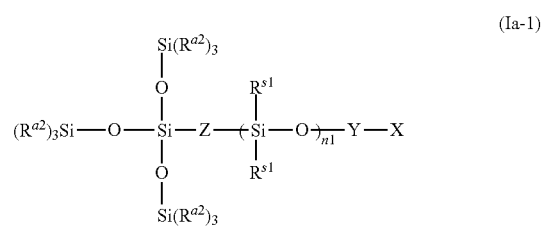

wherein, in formula (Ia-1),

Y represents a single bond or $*-Si(R^{s2})_2-L^{s1}$ and $*$ represents a bond with an oxygen atom, Z represents an oxygen atom or a divalent hydrocarbon group having 1 to 10 carbon atoms, $R^{a2}$ each independently represents an alkyl group having 1 to 4 carbon atoms, $R^{s1}$ and $R^{s2}$ each independently represents a hydrocarbon group having 1 to 10 carbon atoms, $L^{s1}$ represents a divalent hydrocarbon group having 1 to 10 carbon atoms, n1 represents an integer of 1 or more and 150 or less, and X represents a group represented by any one of formulas (X-1) to (X-3):

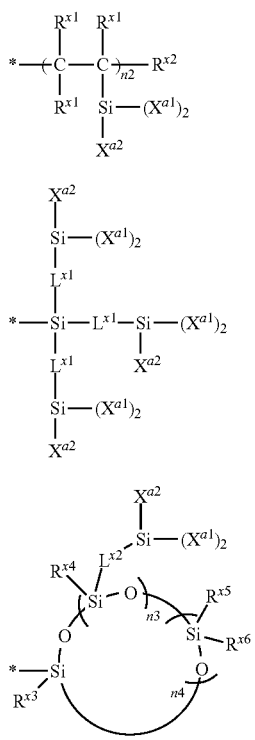

(X-1)

(X-2)

(X-3)

wherein, in formulas (X-1) to (X-3), $L^{x1}$ to $L^{x2}$ each independently represents a divalent hydrocarbon group having 1 to 20 carbon atoms, and a methylene group (—CH$_2$—) included in the divalent hydrocarbon group may be substituted with —O— or —O—Si(R$^{x7}$)$_2$—, $R^{x1}$ to $R^{x7}$ each independently represents a hydrogen atom or a hydrocarbon group having 1 to 10 carbon atoms, $X^{a1}$ each independently represents a hydrolyzable group or a trialkoxysilyloxy group, $X^{a2}$ each independently represents a trialkylsilyl-containing group, a hydrocarbon chain-containing group, a siloxane backbone-containing group, a hydrolyzable group, or a trialkoxysilyloxy group, and $X^{a2}$ and $X^{a1}$ may be the same or different when $X^{a2}$ is a hydrolyzable group, n2 represents an integer of 2 or more and 20 or less, n3 represents an integer of 2 or more and 5 or less, n4 represents an integer of 0 or more and 5 or less, and in formula (X-3), the order of units represented by (Si(R$^{x4}$)(-L$^{x2}$-Si(X$^{a2}$)(X$^{a1}$)$_2$)—O—) and (Si(R$^{x5}$)(R$^{x6}$)—O—) is arbitrary.

\* \* \* \* \*